(12) United States Patent
Hida et al.

(10) Patent No.: US 10,838,880 B2
(45) Date of Patent: Nov. 17, 2020

(54) INFORMATION PROCESSING APPARATUS, INFORMATION PROCESSING METHOD, AND RECORDING MEDIUM THAT PROVIDE INFORMATION FOR PROMOTING DISCUSSION

(71) Applicant: FUJITSU LIMITED, Kawasaki (JP)

(72) Inventors: Kazuo Hida, Sagamihara (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 16/033,815

(22) Filed: Jul. 12, 2018

(65) Prior Publication Data
US 2018/0322073 A1 Nov. 8, 2018

Related U.S. Application Data

(63) Continuation of application No. PCT/JP2016/054350, filed on Feb. 15, 2016.

(51) Int. Cl.
*G06F 13/00* (2006.01)
*G06F 16/00* (2019.01)
(Continued)

(52) U.S. Cl.
CPC .......... *G06F 13/00* (2013.01); *G06F 3/02* (2013.01); *G06F 16/00* (2019.01); *G06Q 50/10* (2013.01)

(58) Field of Classification Search
CPC .......... G06F 17/30; G06F 13/00; G06F 16/00; G06F 3/02; H04N 7/17; G06Q 50/10
See application file for complete search history.

(56) References Cited

U.S. PATENT DOCUMENTS 9,135,291 B2 * 9/2015 Assam .................. G06Q 50/01
2005/0086226 A1 * 4/2005 Krachman ............ G06Q 50/16
(Continued)

FOREIGN PATENT DOCUMENTS

| JP | 2002-342347 | 11/2002 |
| JP | 2008-97078 | 4/2008 |
| JP | 2013-239047 | 11/2013 |

OTHER PUBLICATIONS

International Search Report dated Apr. 26, 2016 in corresponding International Patent Application No. PCT/JP2016/054350.
(Continued)

*Primary Examiner* — Jennifer N To
*Assistant Examiner* — Qi Wan
(74) *Attorney, Agent, or Firm* — Staas & Halsey LLP

(57) ABSTRACT

An information processing apparatus includes a memory; and a processor coupled to the memory, the processor configured to: calculate a degree-of-similarity between information shared within a first group and information shared within a second group, the first and the second groups being among a plurality of groups, each of the plurality of groups sharing information within the each of the plurality of groups; and provide information that promotes a discussion, the information that promotes the discussion being provided when the calculated degree-of-similarity satisfies a predetermined criterion, and the information that promotes the discussion being provided to at least one of the first and the second groups, based on the information shared within the first group and the information shared within the second group.

9 Claims, 19 Drawing Sheets

(51) Int. Cl.
*G06F 3/02* (2006.01)
*G06Q 50/10* (2012.01)

(56) References Cited

U.S. PATENT DOCUMENTS

| | | | | |
|---|---|---|---|---|
| 2006/0026231 A1* | 2/2006 | Degenhardt | ............ | G06Q 10/10 709/204 |
| 2009/0289942 A1* | 11/2009 | Bailloeul | ............ | G06K 9/6247 345/440 |
| 2009/0319917 A1* | 12/2009 | Fuchs | ............ | H04M 3/56 715/753 |
| 2010/0162164 A1* | 6/2010 | Kwon | ............ | H04N 7/17318 715/803 |
| 2012/0102409 A1* | 4/2012 | Fan | ............ | H04W 4/00 715/738 |
| 2014/0075004 A1* | 3/2014 | Van Dusen | ............ | H04L 41/04 709/223 |
| 2015/0106360 A1* | 4/2015 | Cao | ............ | G06F 16/9535 707/723 |
| 2015/0180746 A1* | 6/2015 | Day, II | ............ | H04L 51/16 455/405 |
| 2015/0365725 A1* | 12/2015 | Belyaev | ............ | H04N 21/458 725/46 |
| 2016/0065731 A1* | 3/2016 | Kurstak | ............ | H04M 1/72519 455/414.1 |
| 2017/0324692 A1* | 11/2017 | Zhou | ............ | H04L 51/00 |

OTHER PUBLICATIONS

Written Opinion of International Searching Authority dated Apr. 26, 2016 in corresponding International Patent Application No. PCT/JP2016/054350.

Shino Aoki et al., "An online support system with advices for multiple discussions" IPSJ SIG Notes, vol. 2009, No. 3, Jan. 15, 2009, pp. 79-84.

* cited by examiner

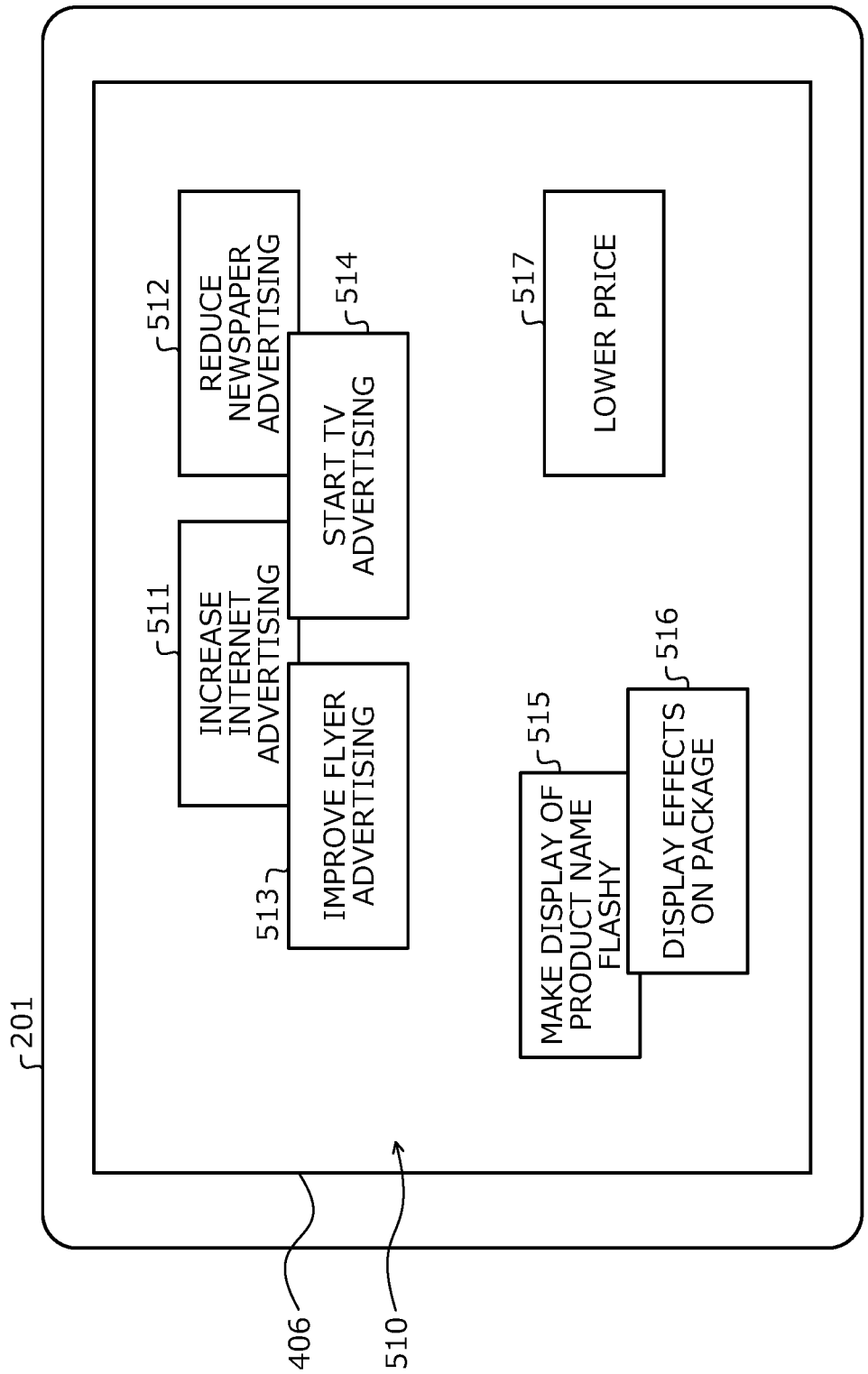

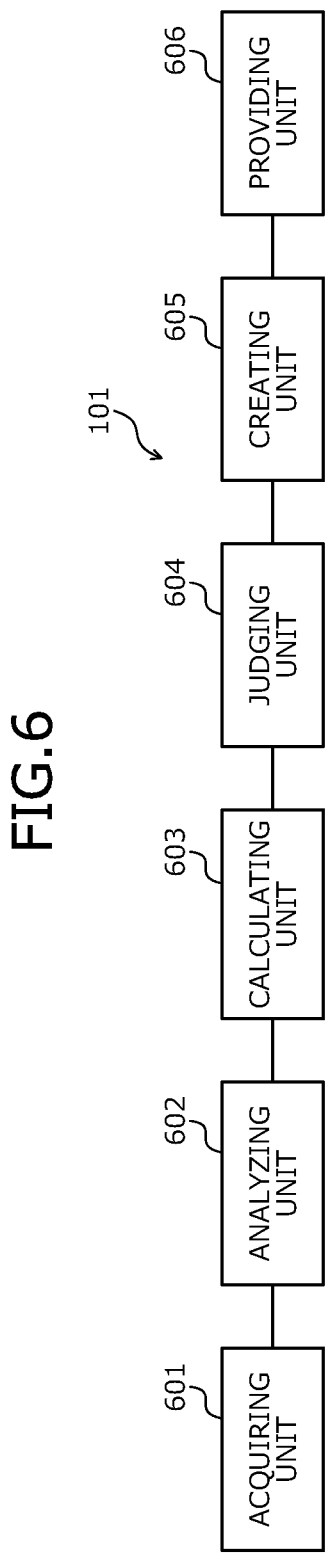

FIG.7

| GROUP ID | TYPE | CONTENTS | POSITION | CLUSTER ID |
|---|---|---|---|---|
| G1 | TAG | INCREASE INTERNET ADVERTISING | (5,8) | c1 |
| G1 | TAG | REDUCE NEWPAPER ADVERTISING | (9,8) | c1 |
| G1 | TAG | IMPROVE FLYER ADVERTISING | (3,8) | c1 |
| G1 | TAG | START TV ADVERTISING | (7,6) | c1 |
| G1 | TAG | MAKE DISPLAY OF PRODUCT NAME FLASHY | (1,4) | c2 |
| G1 | TAG | DISPLAY EFFECTS ON PACKAGE | (2,2) | c2 |
| G1 | TAG | LOWER PRICE | (9,3) | c3 |
| G2 | TAG | SUPPLEMENT ADVERTISING COST BUDGET | (4,9) | c4 |
| G2 | TAG | RECONSIDER ADVERTISING CONTENTS | (8,8) | c4 |
| G2 | TAG | CHANGE ADVERTISING DESIGN | (3,7) | c4 |
| G2 | TAG | MEET WITH ADVERTISING AGENCY | (6,6) | c4 |
| G2 | TAG | CHANGE PACKAGE DISPLAY | (2,3) | c5 |
| G2 | TAG | CLEARLY DISPLAY INGREDIENTS | (3,1) | c5 |
| G2 | TAG | RENEGOTIATE RAW MATERIAL PRICE | (9,2) | c6 |

| GROUP ID | CLUSTER ID | WORD | STATISTICAL FREQUENCY |
|---|---|---|---|
| G1 | c1 | INTERNET | 1 |
| G1 | c1 | ADVERTISING | 4 |
| G1 | c1 | INCREASE | 1 |
| G1 | c1 | NEWSPAPER | 1 |
| G1 | c1 | REDUCE | 1 |
| G1 | c1 | FLYER | 1 |
| G1 | c1 | IMPROVE | 1 |
| G1 | c1 | TV | 1 |
| G1 | c1 | START | 1 |
| G1 | c2 | PRODUCT NAME | 1 |
| G1 | c2 | DISPLAY | 2 |
| G1 | c2 | FLASHY | 1 |
| G1 | c2 | PACKAGE | 1 |
| G1 | c2 | EFFECTS | 1 |
| G1 | c3 | PRICE | 1 |
| G1 | c3 | LOWER PRICE | 1 |
| G2 | c4 | ADVERTISING | 4 |
| G2 | c4 | COST | 1 |
| G2 | c4 | BUDGET | 1 |
| G2 | c4 | SUPPLEMENT | 1 |
| G2 | c4 | CONTENTS | 1 |
| G2 | c4 | RECONSIDER | 1 |
| G2 | c4 | DESIGN | 1 |
| G2 | c4 | CHANGE | 1 |
| G2 | c4 | AGENCY | 1 |
| G2 | c4 | MEET WITH | 1 |
| G2 | c5 | PACKAGE | 1 |
| G2 | c5 | DISPLAY | 2 |
| G2 | c5 | CHANGE | 1 |
| G2 | c5 | INGREDIENTS | 1 |
| G2 | c5 | CLEARLY | 1 |
| G2 | c6 | RAW MATERIAL | 1 |
| G2 | c6 | PRICE | 1 |
| G2 | c6 | RENEGOTIATE | 1 |

800-1, 800-2, ..., 800-34

| ANTONYM 1 | ANTONYM 2 | SEMANTIC DIFFERENCE |
|---|---|---|
| NICHE MARKETING | HIDING | 0.884955752 |
| NICHE MARKETING | NO CHANGE | 0.862068966 |
| HIDING | NO CHANGE | 0.023364486 |

| PROVISION WORD | REFERENCE DATA |
|---|---|
| NICHE MARKETING | xxx.jpg |

| PROVISION WORD | REFERENCE DATA |
|---|---|
| HIDING | xxx.jpg |

| TIME (min) | 5 | 10 | 15 | 20 | 25 | 30 | 35 | 40 | 45 | EVALUATION |
|---|---|---|---|---|---|---|---|---|---|---|
| WRITE-COUNT | 3 | 5 | 7 | 9 | 15 | 2 | 1 | 0 | 0 | 98/100 |

DISCUSSION LOG

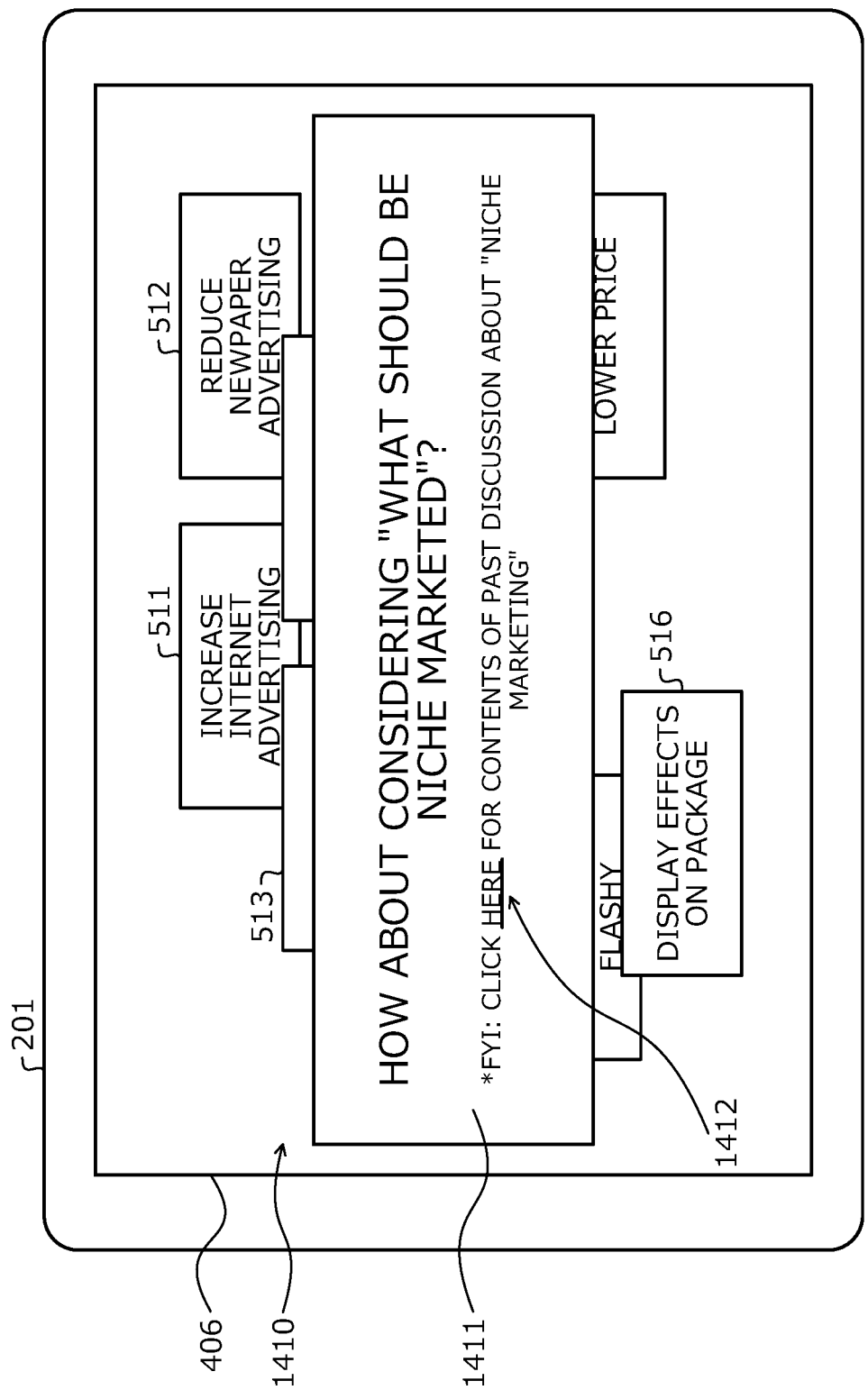

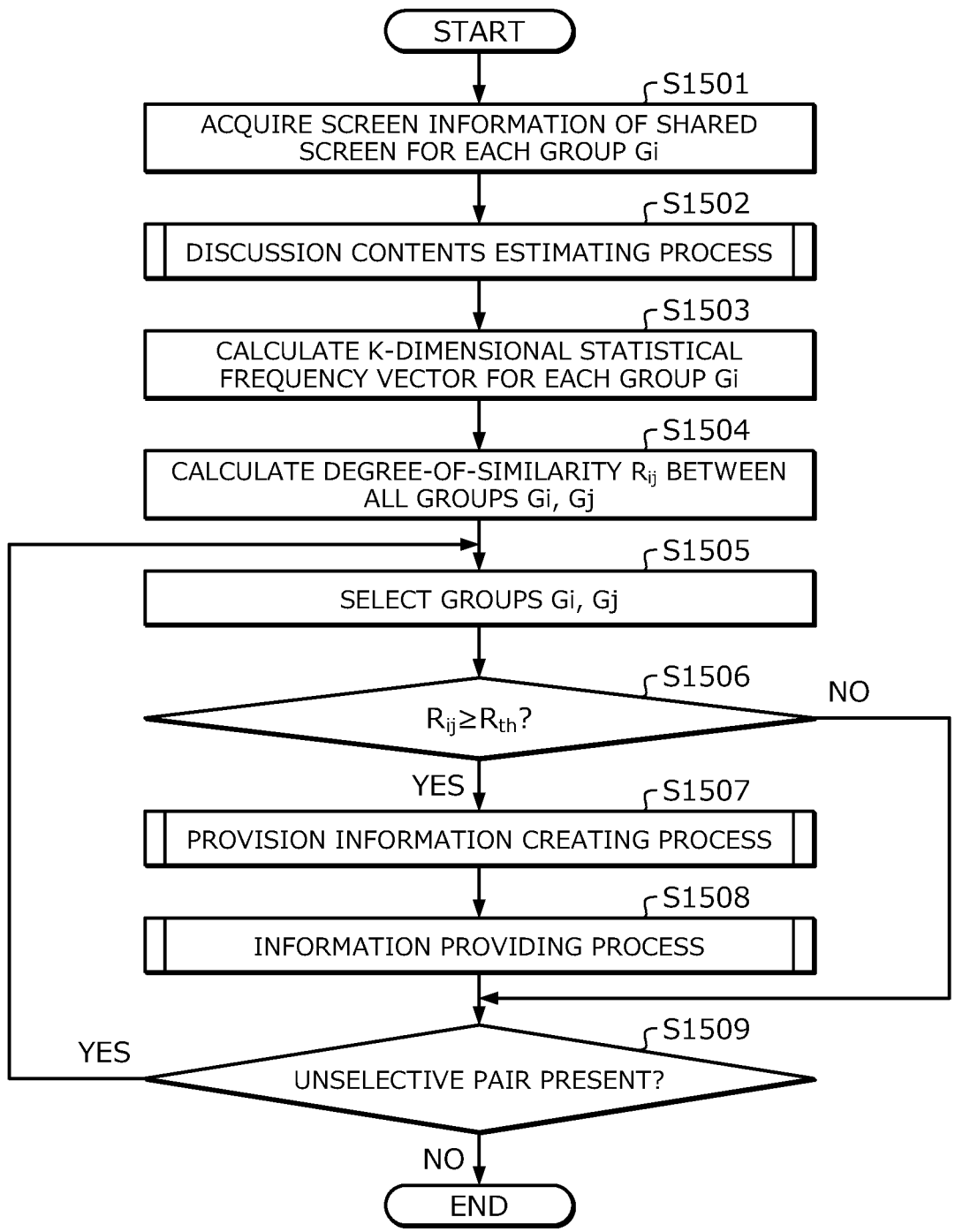

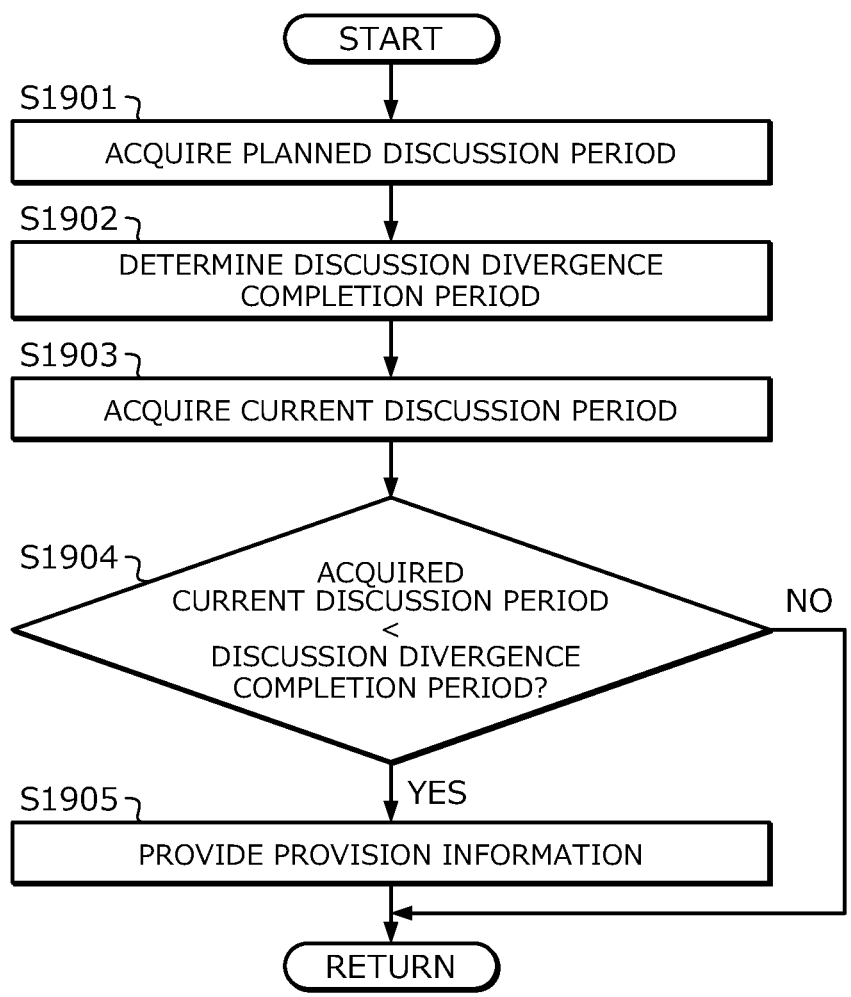

INFORMATION PROCESSING APPARATUS, INFORMATION PROCESSING METHOD, AND RECORDING MEDIUM THAT PROVIDE INFORMATION FOR PROMOTING DISCUSSION

CROSS REFERENCE TO RELATED APPLICATIONS

This application is a continuation application of International Application PCT/JP2016/054350, filed on Feb. 15, 2016, and designating the U.S., the entire contents of which are incorporated herein by reference.

FIELD

The embodiments discussed herein are related to an information processing apparatus, an information processing method, and a recording medium.

BACKGROUND

Recently, in various fields, opportunities for small groups of people to be formed to facilitate dialogue and generate various ideas are being established. One dialogue scheme employed in such cases is the so-called World Café Method. The World Café Method is gaining attention as a dialogue scheme for listening to various opinions of other people to generate free opinions and ideas.

According to a related prior art, for example, when dialogue in small groups of people is to take place and a single proposition given, multiple conclusions are derived by each group and documents for each group are made available to all participants at the time of presentation. Another technique enables information to be provided from a certain community to another community to promote the sharing of knowledge between communities. For examples, refer to Japanese Laid-Open Patent Publication Nos. 2013-239047 and 2002-342347.

SUMMARY

According to an aspect of an embodiment, an information processing apparatus includes a memory; and a processor coupled to the memory, the processor configured to: calculate a degree-of-similarity between information shared within a first group and information shared within a second group, the first and the second groups being among a plurality of groups, each of the plurality of groups sharing information within the each of the plurality of groups; and provide information that promotes a discussion, the information that promotes the discussion being provided when the calculated degree-of-similarity satisfies a predetermined criterion, and the information that promotes the discussion being provided to at least one of the first and the second groups, based on the information shared within the first group and the information shared within the second group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5A is a diagram of an example of a shared screen;

FIG. 6 is a block diagram of an example of a functional configuration of the information processing apparatus 101;

FIG. 7 is a diagram of a concrete example of shared screen data;

FIG. 8 is a diagram of a concrete example of a statistical frequency distribution table;

FIG. 13 is a diagram of an example of contents of a discussion log table 1300;

FIG. 14A is a diagram of an example of display of provision information;

FIG. 15 is a flowchart of an example of an information processing procedure of the information processing apparatus 101;

FIG. 19 is a flowchart of an example of a detailed process procedure of an information providing process.

DESCRIPTION OF THE INVENTION

First, problems associated with the conventional techniques will be described. With the conventional techniques, the contents of the discussions at the groups may become similar, thereby making it difficult to have discussions from various perspectives as group work.

Embodiments of an information processing apparatus, an information processing method, and a recording medium according to the present invention will be described in detail with reference to the accompanying drawings.

Figure 1:
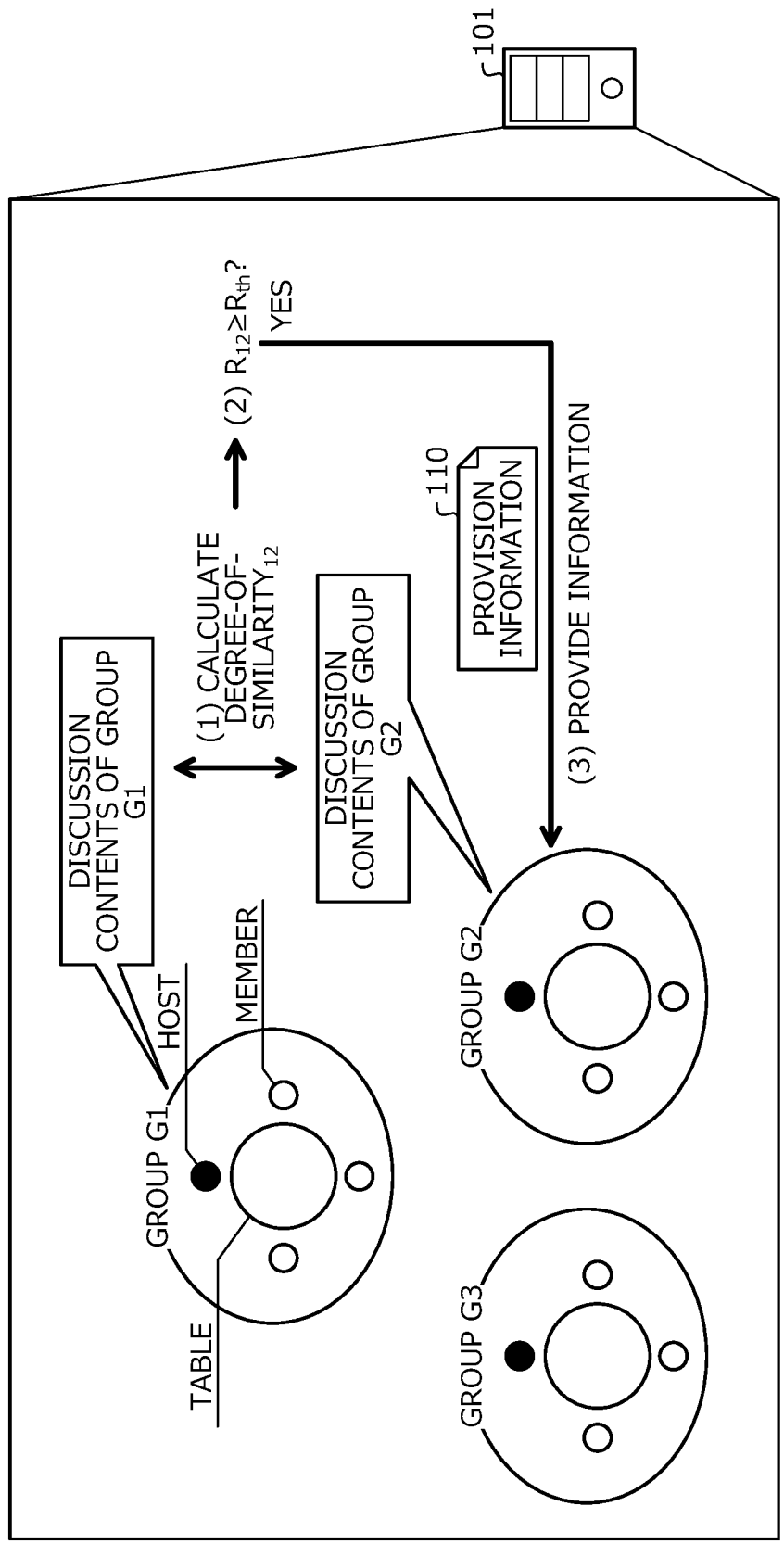
FIG. 1 is a diagram of an example of an information processing method according to an embodiment.

FIG. 1 is a diagram of an example of the information processing method according to an embodiment. In FIG. 1, an information processing apparatus 101 is a computer configured to provide to a group included among groups G1 to Gn (n: a natural number of 2 or more), information that encourages a change in the direction of a discussion of the group.

The groups G1 to Gn are each a group that shares information within the group and, for example, the groups G1 to Gn are formed to perform group work. Group work is the formation of small groups of people to think about, as a group, a certain topic (proposition) and create something, draw a conclusion, etc.

Each group is constituted of members who discuss, as a group, a topic (for example, "What is necessary to make the Tokyo Olympics successful?") common to the groups G1 to Gn. Pieces of information shared within the groups, respectively, are, for example, pieces of information indicating discussion contents regarding the topic common to the groups G1 to Gn.

Here, the world café method is one dialogue scheme for listening to various opinions of other people to generate free opinions and ideas. The world café method is a scheme in which a common topic is discussed in groups and then, group members other than a host move to another group, listen to a summary of the previous discussion from the host and then, further discuss the common topic more deeply; these processes are repeated several times.

However, with such group dialogues aimed at generating ideas, when a common topic is discussed by multiple groups, more than one group may come to the same conclusion. For example, with a method like the World Café Method in which members rotate among the groups, the discussions of the groups become more likely to sway toward the opinion of a member with a strong influence, such as an outspoken member. As a result, discussion contents of the groups are similar and the same conclusion tends to be reached by each of the groups. Thus, since dialogues by the groups do not diverge, it cannot be said that discussion is performed efficiently.

Thus, in the present embodiment, an information processing method will be described that enlivens discussion at the group level and activates discussion at groups overall (group work). Hereinafter, an example of processing by the information processing apparatus 101 will be described. In the description hereinafter, an arbitrary group of the groups G1 to Gn may be indicated as "group Gi" (i=1, 2, . . . , n).

(1) The information processing apparatus 101 calculates a degree-of-similarity $R_{ij}$ of information shared within a group Gi and information shared within a group Gj (j≠i, j=1, 2, . . . , n) of the groups G1 to Gn. In particular, for example, the information processing apparatus 101 analyzes the information shared within the group Gi and identifies a representative word that characterizes the information shared within the group Gi.

The information processing apparatus 101 further analyzes information shared within the group Gj and identifies a representative word that characterizes the information shared within the group Gj. Subsequently, the information processing apparatus 101 calculates the degree-of-similarity $R_{ij}$ between the groups Gi, Gj, based on the representative word of the group Gi and the representative word of the group Gj.

In the example depicted in FIG. 1, a case is assumed in which of the groups G1 to G3, a degree-of-similarity $R_{12}$ between the information shared within the group G1 and the information shared within the group G2 is calculated.

(2) The information processing apparatus 101 judges whether the calculated degree-of-similarity $R_{ij}$ satisfies a predetermined criterion. In particular, for example, the information processing apparatus 101 may judge whether the calculated degree-of-similarity $R_{ij}$ is at least a threshold $R_{th}$. Here, the threshold $R_{th}$ may be arbitrarily set to a value for which the information shared within the group Gi and the information shared within the group Gj may be said to be similar when the degree-of-similarity $R_{ij}$ is the threshold $R_{th}$ or greater.

In the example depicted in FIG. 1, the degree-of-similarity $R_{12}$ of the information shared within the group G1 and the information shared within the group G2 is assumed to be the threshold $R_{th}$ or greater.

(3) The information processing apparatus 101 provides to the group Gi and/or the group Gj based on the information provided thereby, information that promotes discussion, e.g., information that encourages a change in the direction of the discussion, when the calculated degree-of-similarity $R_{ij}$ satisfies the predetermined criterion. Here, the information that encourages a change in the direction of the discussion is, for example, information that encourages the discussion to diverge.

The information that encourages a change in the direction of the discussion is created, for example, based on the representative word that characterizes the information shared within the group. In particular, for example, the information processing apparatus 101 may create as the information that encourages a change in the direction of the discussion at the group Gi, information that includes an antonym of the representative word that characterizes the information shared within the group Gi.

In the example depicted in FIG. 1, a case is assumed in which provision information 110 that is based on the information shared within the group G2 is provided to the group G2. The provision information 110 is information that encourages a change in the direction of the discussion at the group G2 and, for example, includes an antonym of the representative word that characterizes the information shared within the group G2.

When the information processing apparatus 101 provides to the groups G1, G2, information that encourages a change in the direction of the discussion, the information processing apparatus 101 provides information that differs between the groups G1, G2.

In this manner, according to the information processing apparatus 101, when the contents of the discussion at each of the groups Gi, Gj are similar and the same conclusion is likely to be drawn between the groups Gi, Gj, information that encourages a change in the direction of the discussion may be provided to at least one of the groups Gi, Gj.

As a result, discussion at the group level may be enlivened and discussions in the group work may be activated. In the example depicted in FIG. 1, the provision information 110 may be provided that encourages the discussion at the group G2 in a direction so as to diverge, whereby the discussion by the group G2 is enlivened, enabling the discussions at the groups G1 to G3 overall to be activated.

An example of system configuration of a group work system 200 according to embodiment will be described.

Figure 2:
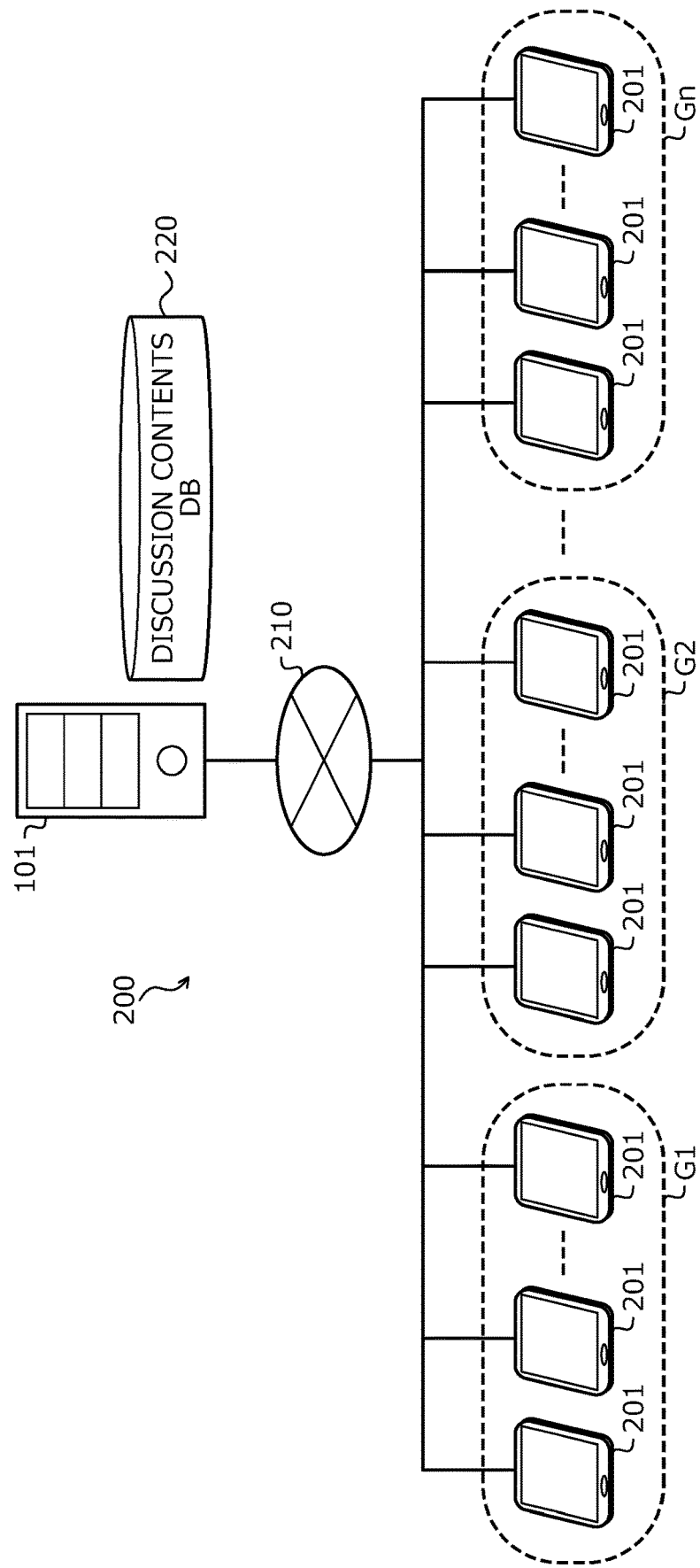
FIG. 2 is a diagram of an example of system configuration of a group work system 200.

FIG. 2 is a diagram of an example of system configuration of the group work system 200. In FIG. 2, the group work system 200 includes the information processing apparatus 101 and plural terminal apparatuses 201. In the group work system 200, the information processing apparatus 101 and the plural terminal apparatuses 201 are connected through a network 210 that is wired or wireless. The network 210 is, for example, a local area network (LAN), a wide area network (WAN), the Internet, etc.

The information processing apparatus 101 has a discussion contents database (DB) 220 and provides to a terminal apparatus 201 in the group Gi of the groups G1 to Gn, information that encourages a change in the direction of the discussion at the group Gi. The groups G1 to Gn are a set of groups each formed of a small number of people to perform group work.

The discussion contents DB 220 stores various types of information related to the contents discussed by each of the groups Gi regarding various topics. The discussion contents DB 220 includes, for example, a discussion contents list, a discussion log table, etc. Contents of a discussion contents list will be described with reference to FIG. 9. Further, contents of a discussion log table will be described with reference to FIG. 13.

The information processing apparatus 101 is, for example, a server. However, the information processing apparatus 101 may be realized by any one of the plural terminal apparatuses 201 in the group work system 200.

The terminal apparatuses 201 are computers used by users participating in the group work. The terminal apparatuses 201 may be, for example, general purpose computing apparatuses such as a personal computer (PC), a tablet PC, a smart phones, etc., or may be apparatuses dedicated for group work.

The users are members of the group Gi, which is any one of the groups G1 to Gn, and discuss as a group, a topic common to the groups G1 to Gn. In this case, at the terminal apparatuses 201, when the users designate a group ID of the group Gi to which the users belong, identical information is displayed at the terminal apparatuses 201 of the users that designated the same group ID, i.e., users in the same group Gi. As a result, for each of the groups Gi, a display screen is shared among the terminal apparatuses 201 in the group Gi and information is shared among members in the group Gi.

The pieces of information shared within the group Gi, respectively, are pieces of information indicating the discussion contents regarding the common topic. For example, on the shared screen displayed on the terminal apparatuses 201, the members may write, edit, delete, etc. various types of information such as figures, Web pages, images, tags, and text indicating the discussion contents regarding the common topic.

An example of a shared screen displayed at the terminal apparatuses 201 of the group Gi will be described with reference to FIGS. 5A and 5B.

Figure 3:
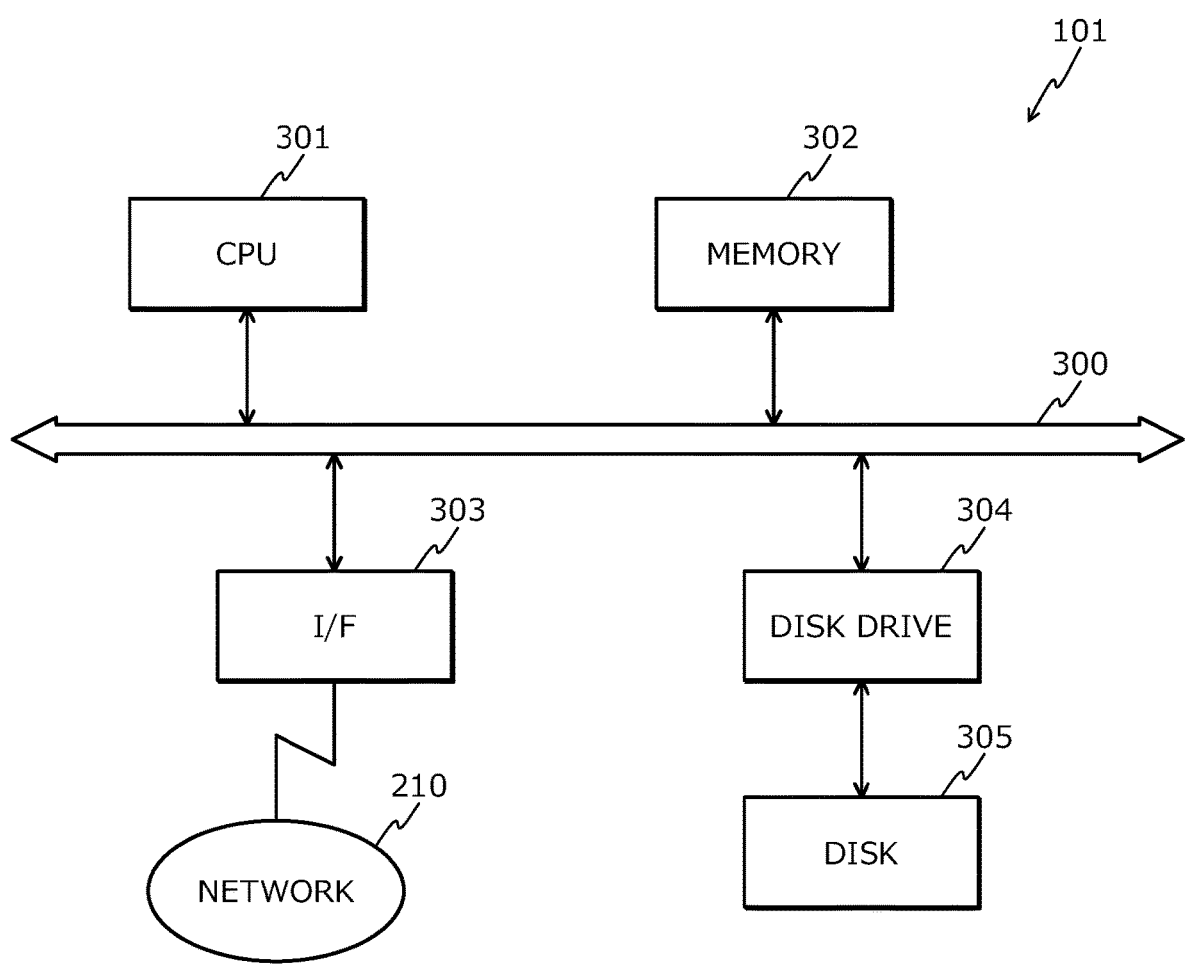
FIG. 3 is a block diagram of an example of a hardware configuration of an information processing apparatus 101.

FIG. 3 is a block diagram of an example of a hardware configuration of the information processing apparatus 101. In FIG. 3, the information processing apparatus 101 includes a central processing unit (CPU) 301, a memory 302, an interface (I/F) 303, a disk drive 304, and a disk 305. Constituent components are each connected by a bus 300.

Here, the CPU 301 governs overall control of the information processing apparatus 101. The memory 302 includes, for example, a read-only memory (ROM), a random access memory (RAM), and a flash ROM. In particular, for example, the flash ROM and the ROM store various types of programs; and the RAM is used as a work area of the CPU 301. A program stored in the memory 302 is loaded onto the CPU 301, whereby an encoded process is executed by the CPU 301.

The I/F 303 is connected to the network 210 through a communications line and is connected to an external computer (for example, the terminal apparatus 201 depicted in FIG. 2) via the network 210. The I/F 303 administers an interface between the information processing apparatus 101 and the network 210 and controls the input and output of data from the external computer. For example, a modem, a LAN adapter, etc. may be adopted as the I/F 303.

The disk drive 304, under the control of the CPU 301, controls the reading and writing of data with respect to the disk 305. The disk 305 stores data written thereto under the control of the disk drive 304. For example, a magnetic disk, an optical disk, etc. may be adopted as the disk 305.

In addition to the constituent components above, the information processing apparatus 101 may further have, for example, a solid state drive (SSD), a keyboard, a mouse, a display, etc.

Figure 4:
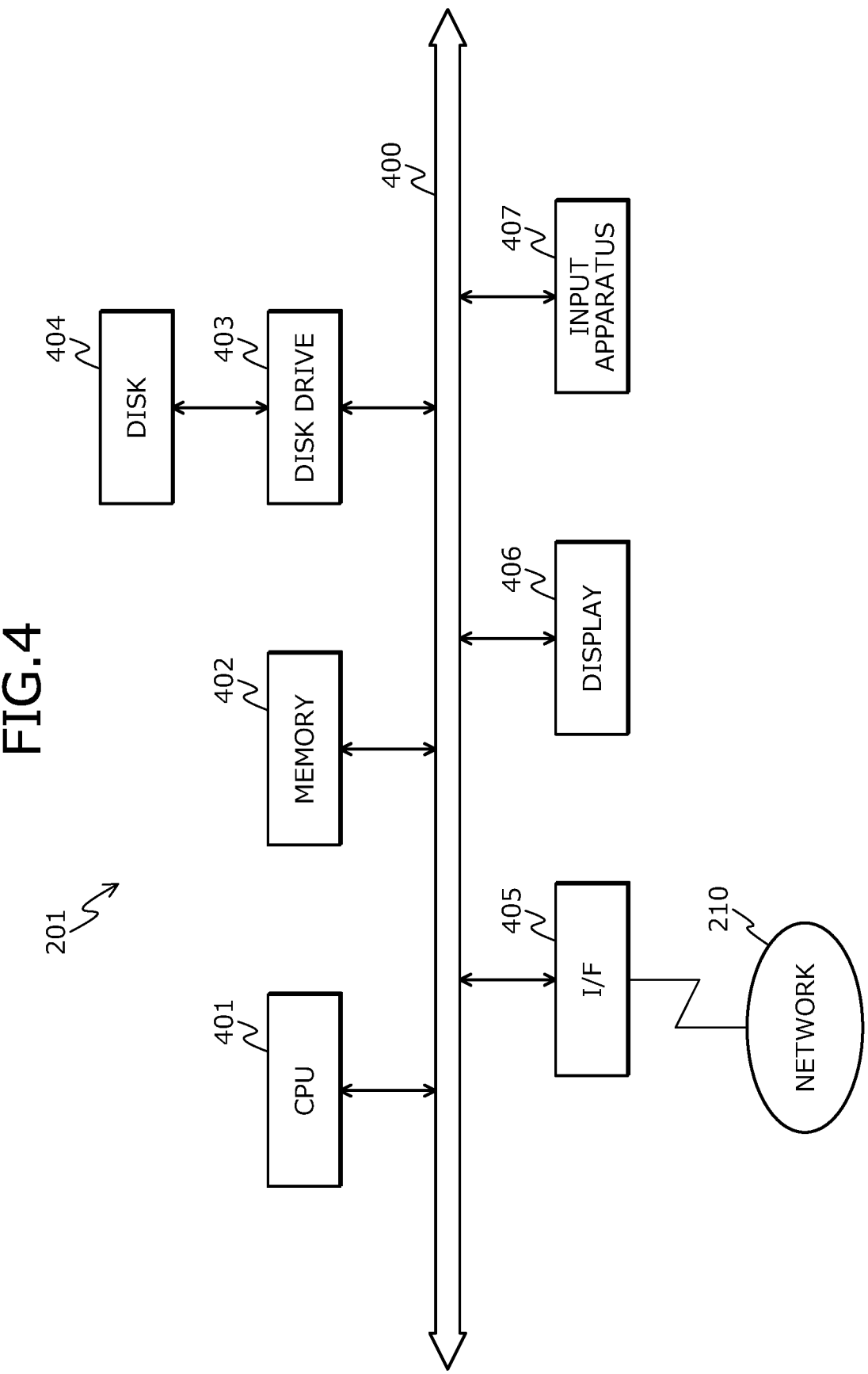
FIG. 4 is a block diagram of an example of hardware configuration of a terminal apparatus 201.

FIG. 4 is a block diagram of an example of hardware configuration of the terminal apparatus 201. In FIG. 4, the terminal apparatus 201 includes a CPU 401, a memory 402, a disk drive 403, a disk 404, an I/F 405, a display 406, and an input apparatus 407. Constituent components are each connected by a bus 400.

Here, the CPU 401 governs overall control of the terminal apparatus 201. The memory 402 includes, for example, a ROM, a RAM, and a flash ROM. In particular, for example, the flash ROM and the ROM store various types of programs; and the RAM is used as a work area of the CPU 401. A program stored in the memory 402 is loaded onto the CPU 401, whereby an encoded process is executed by the CPU 401.

The disk drive 403, under the control of the CPU 401, controls the reading and writing of data with respect to the disk 404. The disk 404 stores data written thereto under the control of the disk drive 403. For example, a magnetic disk, an optical disk, etc. may be adopted as the disk 404.

The I/F 405 is connected to the network 210 through a communications line and is connected to an external computer (for example, the information processing apparatus 101 depicted in FIG. 2) via the network 210. The I/F 405 administers an interface between the terminal apparatus 201 and the network 210 and controls the input and output of data from the external computer.

The display 406 displays data such as text, images, functional information, etc. in addition to a cursor, icons or toolboxes, etc. The display 406 may be, for example, a liquid crystal display, an organic electroluminescence (EL) display, a cathode ray tube (CRT), etc.

The input apparatus 407 has keys for inputting characters, numerals, various instructions, etc. and inputs data. The input apparatus 407 may be a keyboard, a mouse, or the like, or may be a touch-panel-type input pad, a numeric pad, or the like.

The terminal apparatus 201 may be configured to omit, for example, the disk drive 403, the disk 404, etc. among the constituent components above.

An example of a shared screen that is displayed on the display 406 of each of the terminal apparatuses 201 in the group Gi will be described with reference to FIGS. 5A and 5B. Here, taking the groups G1, G2 of the groups G1 to Gn as an example, an example of a shared screen that is displayed on the displays 406 of the terminal apparatuses 201 will be described.

FIG. 5A is a diagram of an example of a shared screen. In FIG. 5A, a shared screen 510 is a display screen shared among the terminal apparatuses 201 in the group G1.

In the shared screen 510, tag information 511 to 517 is displayed. The tag information 511 to 517 is information that is input and shared when a common topic "What is necessary to improve sales of product X?" is discussed at the group G1 and indicates the contents discussed by the group G1.

Figure 5B:
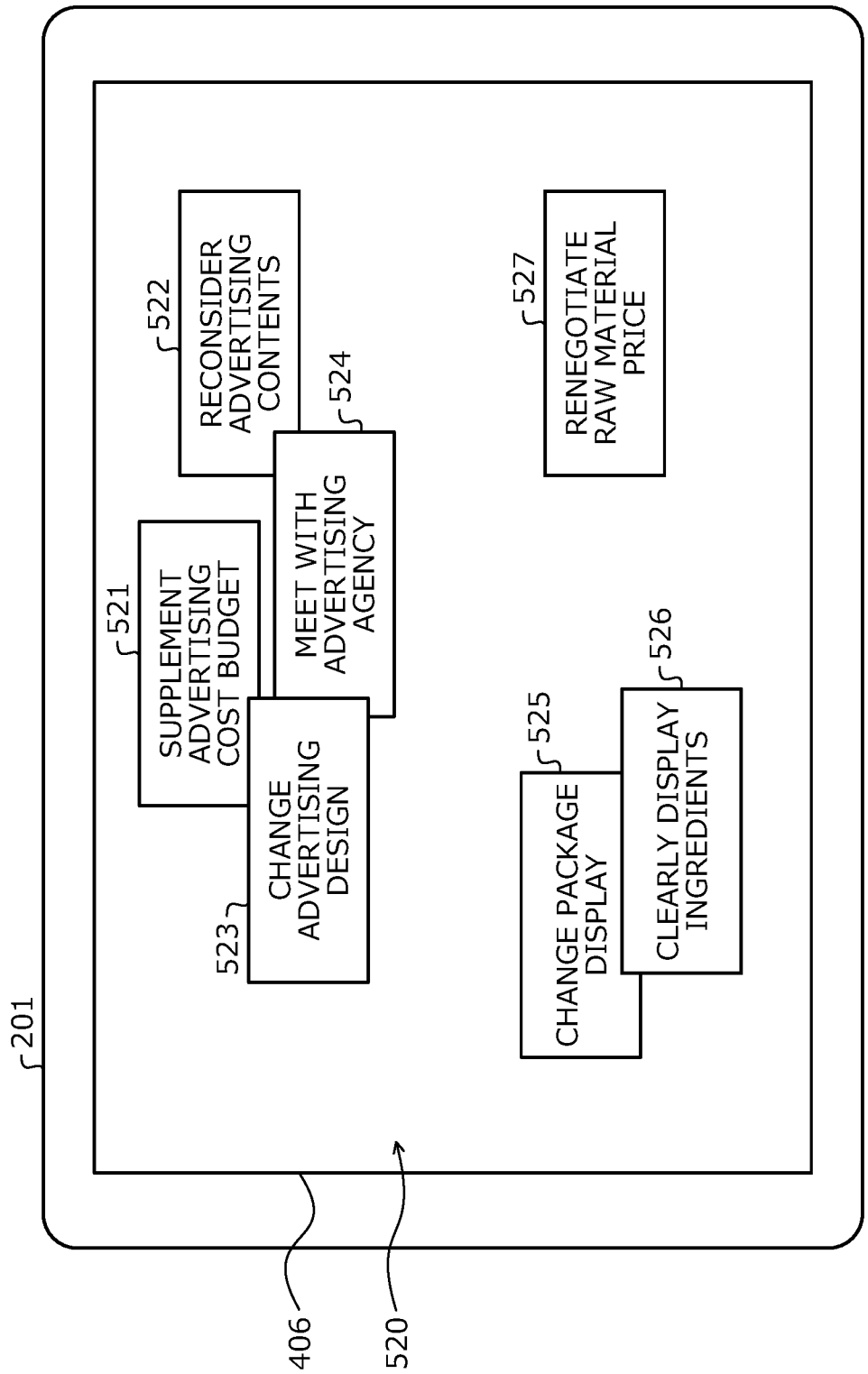
FIG. 5B is a diagram of another shared screen.

FIG. 5B is a diagram of another shared screen. In FIG. 5B, a shared screen 520 is a display screen shared among the terminal apparatuses 201 of the group G2.

Further, in the shared screen 520, tag information 521 to 527 is displayed. The tag information 521 to 527 is information that is input when the common topic "What is necessary to improve sales of product X" is discussed at the group G2 and indicates the contents discussed by the group G2.

FIG. 6 is a block diagram of an example of a functional configuration of the information processing apparatus 101. In FIG. 6, the information processing apparatus 101 is configured to include an acquiring unit 601, an analyzing unit 602, a calculating unit 603, a judging unit 604, a creating unit 605, and a providing unit 606. The acquiring unit 601 to the providing unit 606 are functions constituting a control unit and in particular, for example, these functions are realized by executing on the CPU 301, a program stored in a storage apparatus such as the memory 302, the disk 305 depicted in FIG. 3, etc. or by the I/F 303. Processing results of the functional units are, for example, stored to a storage apparatus such as the memory 302, the disk 305, etc.

The acquiring unit 601 acquires information shared within the group Gi. In particular, for example, the acquiring unit 601 receives from one of the terminal apparatuses 201 (for example, the terminal apparatus 201 that is a host) in the group Gi, screen information of a shared screen and thereby, acquires screen information of a shared screen that is shared among the terminal apparatuses 201 in the group Gi.

The timing at which the information shared within the group Gi is acquired may be arbitrarily set. For example, configuration may be such that each time pieces of information shared within the groups Gi, respectively, are updated, the acquiring unit 601 acquires the pieces of information shared within the groups Gi, respectively. Further, for example, the acquiring unit 601 may acquire the pieces of information shared within the groups Gi, respectively, after the group work starts, i.e., after an elapse of a predetermined period (for example, after 20 minutes elapses) from the start of the discussion by each of the groups Gi.

Further, for example, the acquiring unit 601 may acquire the pieces of information shared within the groups Gi, respectively, at each elapse of a predetermined time interval (for example, every 10 to 20 minutes) from the start of the discussion at each of the groups Gi. Further, for example, at the start of the discussion by each of the groups Gi, the acquiring unit 601 may acquire pieces of information of summaries of previous discussions, shared within the groups Gi, respectively.

The analyzing unit 602 analyzes the acquired information shared within the group Gi. In particular, for example, the analyzing unit 602 extracts from the screen information of the shared screen shared within the group Gi, characters (tag) and/or an image. Further, the analyzing unit 602 identifies position coordinates of the characters (tag) and/or image in the shared screen.

Next, the analyzing unit 602 performs image recognition processing on the extracted image and thereby, extracts characters from the image, recognizes what the image represents, converts the image into characters, etc. The analyzing unit 602 performs cluster analysis on the characters and divides the characters into subsets (clusters), based on the identified position coordinates of characters (including characters converted from the image).

As a result, characters (including characters converted from an image) input on a shared screen may be clustered using a tendency for the characters (sentences or words) having similar meanings to be discussed at a similar points, when people are having a discussion. A result of cluster analysis, for example, is set in shared screen data.

Here, a concrete example of shared screen data generated based on the screen information of the shared screens 510, 520 depicted in FIGS. 5A and 5B will be described with reference to FIG. 7.

FIG. 7 is a diagram of the concrete example of shared screen data. In FIG. 7, shared screen data 700 has fields for group IDs, types, contents, positions, and cluster IDs; and stores character data 700-1 to 700-14 as records by a setting of information into the fields.

The group ID is an identifier that uniquely identifies the group Gi. The type indicates the type of the characters (including characters converted from an image) input on the shared screen of the group Gi. As the type, for example, a tag, an image, etc. may be set. The contents indicate the contents of the characters. The position indicates the position coordinates of the characters in the shared screen. The cluster ID is an identifier that uniquely identifies a cluster c to which the characters belong.

For example, the character data 700-1 indicates the type "tag", the contents "increase internet advertising", the position (5,8) and the cluster ID "c1" for the characters identified from tag information 511 input into the shared screen 510 (refer to FIG. 5A) of the group G1.

In FIG. 6, the analyzing unit 602, for example, based on the shared screen data (for example, refer to FIG. 7), performs morphological analysis of the characters of the clusters c and extracts from the characters of the clusters c, words (for example, nouns, verbs, adjectives). The analyzing unit 602, for each of the clusters c, calculates statistical frequencies of the extracted words. A statistical frequency of a word is a statistical frequency representing a frequency that the word occurs. The calculated statistical frequencies of the words are, for example, set in a statistical frequency distribution table.

Here, a concrete example of a statistical frequency distribution table generated based on the shared screen data 700 depicted in FIG. 7 will be described with reference to FIG. 8.

FIG. 8 is a diagram of the concrete example of a statistical frequency distribution table. In FIG. 8, a statistical frequency distribution table 800 has fields for group IDs, cluster IDs, words, and statistical frequencies; and stores statistical frequency information 800-1 to 800-34 as records by a setting of information into the fields.

The group ID is an identifier that uniquely identifies the group Gi. The cluster ID is an identifier that uniquely identifies the cluster c. The word is a word in the cluster c. The statistical frequency is a statistical frequency of the word in the cluster c. For example, the statistical frequency information 800-1 indicates the statistical frequency "1" of the word "Internet" in the cluster c1 of the group G1.

In the description above, while the statistical frequencies of words are calculated for each of the clusters c of each of the groups Gi, configuration is not limited hereto. For example, the analyzing unit 602 may remove frames of the clusters c in the group Gi and calculate for each of the groups Gi, the statistical frequencies of the words.

In FIG. 6, the analyzing unit 602 identifies a representative word that characterizes the information shared within the group Gi. In particular, for example, the analyzing unit 602 may identify the representative word of the group Gi based on the statistical frequency distribution table (for example, refer to FIG. 8).

In more detail, for example, the analyzing unit 602, for each of the groups Gi, may compare the statistical frequencies of the words and identify as the representative word of the group Gi, the word having the greatest statistical frequency. The statistical frequency of a word is, for example, the statistical frequency of the word for each cluster c and/or the statistical frequency of the word for each group Gi.

Further, for example, the analyzing unit 602 may compare the statistical frequencies of the words for each of the clusters c and identify as the representative word of the group Gi, plural words (for example, the top three words) having highest statistical frequencies. Further, for example, the analyzing unit 602 may identify as the representative word of the group Gi, a word whose statistical frequency according to cluster c is at least a threshold. The threshold may be arbitrarily set. The identified representative word, for example, is registered to a discussion contents list.

Here, a concrete example of a discussion contents list generated based on the statistical frequency distribution table 800 depicted in FIG. 8 will be described with reference to FIG. 9.

Figure 9:
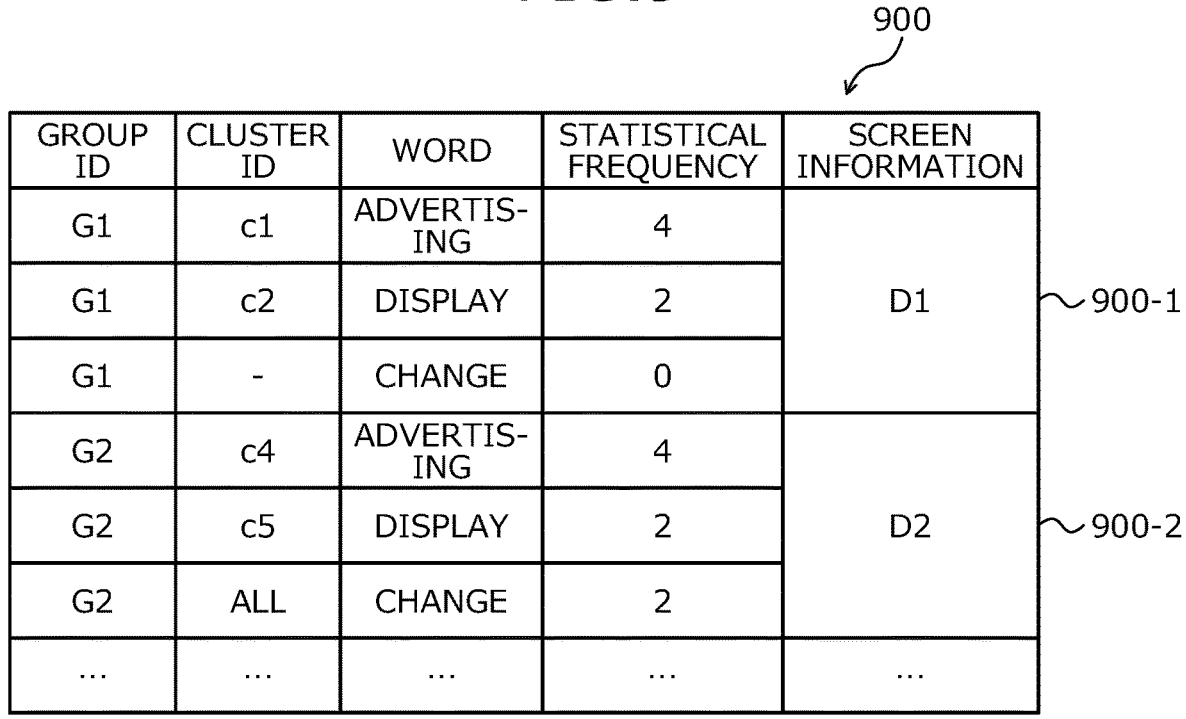
FIG. 9 is a diagram of a concrete example of a discussion contents list.

FIG. 9 is a diagram of the concrete example of a discussion contents list. In FIG. 9, a discussion contents list 900 has fields for group IDs, cluster IDs, words, statistical frequencies, and screen information; and stores according to group Gi, discussion contents information (for example, discussion contents information 900-1, 900-2) as records by a setting of information into the fields.

Here, the group ID is an identifier that uniquely identifies the group Gi. The cluster ID is an identifier that uniquely identifies the cluster c in the group Gi. However, a cluster ID "ALL" represents that all clusters in the group Gi are encompassed. The word is the representative word in the cluster c identified by the corresponding cluster ID.

The statistical frequency is the statistical frequency of the representative word, in the cluster c identified by the corresponding cluster ID. The screen information is the screen information of a shared screen that is shared within the group Gi. For example, the discussion contents information 900-1 indicates the statistical frequency (for example, the statistical frequency "4" of the representative word "advertising" in the cluster c1) of the representative word for each of the clusters c of the group G1 and the screen information of the shared screen 510 (refer to FIG. 5A) that is shared within the group G1.

A cluster ID "-" indicates a representative word that is not present in the group thereof and that corresponds to a representative word present in another group. For example, in the discussion contents information 900-1, a representative word "change" is set which is a representative word that is not present in the group G1 and that is present in the group G2.

In FIG. 6, the calculating unit 603 calculates the degree-of-similarity $R_{ij}$ of the information shared within the group Gi and the information shared within the group Gj ($j \neq i$) among the groups G1 to Gn. In particular, for example, the calculating unit 603 may calculate based on the statistical frequencies of the representative words of the groups Gi, Gj, a correlation coefficient between the groups Gi, Gj and thereby, calculate the degree-of-similarity $R_{ij}$ between the groups Gi, Gj.

In more detail, for example, the calculating unit 603 refers to the discussion contents list (for example, the discussion contents list 900 depicted in FIG. 9) and calculates for each of the groups Gi, K-dimensional statistical frequency vectors that assume as elements, the statistical frequencies of the representative words of K types, obtained for each of the groups G1 to Gn. The calculating unit 603 uses equations (1) to (3) to obtain a correlation coefficient R (=the degree-of-similarity $R_{ij}$) between the statistical frequency vectors (x1, x2, ..., xK) of the group Gi and the statistical frequency vectors (y1, y2, ..., yK) of the group Gj.

$$R = \frac{\sum_{k=1}^{K}(x_k - \bar{x})(y_k - \bar{y})}{\sqrt{\sum_{k=1}^{K}(x_k - \bar{x})^2}\sqrt{\sum_{k=1}^{K}(y_k - \bar{y})^2}} \quad (1)$$

$$\bar{x} = \frac{1}{K}\sum_{k=1}^{K} x_k \quad (2)$$

$$\bar{y} = \frac{1}{K}\sum_{k=1}^{K} y_k \quad (3)$$

For example, for the discussion contents list 900 depicted in FIG. 9, the correlation coefficient R (=the degree-of-similarity $R_{12}$) between the groups G1, G2 is "R=$R_{12}$=0.866025". In the description above, while the statistical frequencies of the representative words obtained for all of the groups G1 to Gn are assumed as elements, configuration is not limited hereto. For example, the calculating unit 603 may calculate the statistical frequency vectors that assume as elements, the statistical frequencies of words that are obtained by all of the groups G1 to Gn and that have a statistical frequency that is a certain number or greater.

The judging unit 604 judges whether the calculated the degree-of-similarity $R_{ij}$ between the groups Gi, Gj satisfies a predetermined criterion. In particular, for example, the judging unit 604 judges whether the degree-of-similarity $R_{ij}$ is at least the threshold $R_{th}$. The threshold $R_{th}$, as described above, may be arbitrarily set and is set to a value (for example, about 0.7) for which the discussion may be said to be similar between the groups Gi, Gj when the degree-of-similarity $R_{ij}$ is the threshold $R_{th}$ or greater.

Further, the threshold $R_{th}$ may be a value set by learning. For example, the judging unit 604 may retain the degree-of-similarity when judging that discussions that are similar between the groups Gi, Gj are being conducted by a facilitator, etc. and set as the threshold $R_{th}$, a value (for example, average value, minimum value, maximum value, etc.) that is based on the retained degree-of-similarity.

For example, assuming the threshold $R_{th}$ is "$R_{th}$=0.7", the degree-of-similarity $R_{12}$ (=the correlation coefficient R) between the groups G1, G2 is "$R_{12}$=0.866025" and therefore, is judged to be equal to the threshold $R_{th}$ or greater.

The creating unit 605 creates provision information for at least one of the groups Gi, Gj, when the degree-of-similarity $R_{ij}$ satisfies the predetermined criterion. Here, the provision information is information that encourages a change in the direction of the discussion. Further, when creating the provision information for both of the groups Gi, Gj, the creating unit 605 creates provision information that differs in content for each of the groups Gi, Gj.

In particular, for example, the creating unit 605 refers to the discussion contents list (for example, the discussion contents list 900 depicted in FIG. 9) and tabulates between the groups Gi, Gj, the statistical frequencies of the representative words. Further, the creating unit 605, for example, refers to antonym dictionary information and searches for an antonym of a representative word whose statistical frequency has been tabulated between the groups Gi, Gj.

The antonym dictionary information, for example, is stored in a storage apparatus such as the memory 302, the disk 305, etc. However, configuration may be such that the creating unit 605, for example, utilizes an existing antonym search service to search for an antonym of the representative word. The tabulated statistical frequency of the representative word and the retrieved antonym of the representative word, for example, are registered to an antonym list.

Here, a concrete example of an antonym list generated based on the discussion contents list 900 depicted in FIG. 9 will be described with reference to FIG. 10.

Figure 10:
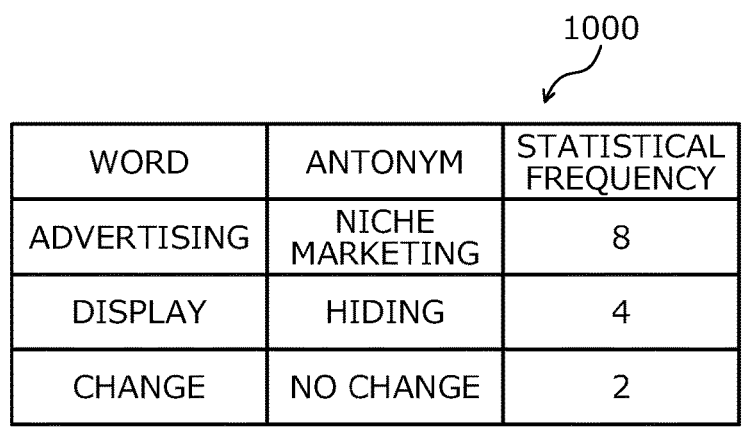
FIG. 10 is a diagram of a concrete example of an antonym list.

FIG. 10 is a diagram of the concrete example of an antonym list. In FIG. 10, an antonym list 1000 correlates and stores the representative words of the groups G1, G2, the antonyms of the representative words, and the statistical frequencies of the representative words. The statistical frequencies of the representative words correspond to priority levels of the antonyms of the representative words. The higher a priority level is, the higher the antonym is regarded as provision information.

For example, the antonym of the representative word "advertising" of the groups G1, G2 is "niche marketing", and the statistical frequency is "8". In other words, the priority level of the antonym "niche marketing" is "8".

In FIG. 6, the creating unit 605 refers to the antonym list (for example, the antonym list 1000 depicted in FIG. 10), and for each combination of a certain number of antonyms having high priority levels (for example, antonyms having the highest three priority levels), calculates a semantic difference between the antonyms. Here, the creating unit 605, for example, may calculate a semantic difference between representative words corresponding to the antonyms, as the semantic difference between the antonyms.

Here, the semantic difference is an index that indicates a strength of a relationship between concepts that words hold. The smaller the semantic difference is, the stronger is the relationship between the concepts. The semantic difference may be defined as, for example, a Euclidean distance in a semantic space such as Latent Semantic Analysis (LSA), Hyperspace Analogue to Language (HAL), etc.

Further, configuration may be such that the semantic difference, for example, is defined as a count of searches performed until a relevant word appears when a search is continuously performed by repeatedly performing a suggest keyword by a search engine. Further, the semantic difference, for example, may be defined as a value obtained by dividing a certain fixed value (for example, 10000) by the number of hits when two words are retrieved by a search engine as search keywords.

The calculated semantic difference between the antonyms, for example, is registered to a semantic difference list.

A concrete example of a semantic difference list generated based on the antonym list 1000 depicted in FIG. 10 will be described with reference to FIG. 11. Here, as an example, a case will be described in which the semantic difference between antonyms is calculated for each combination of the antonyms having the highest three priority levels.

Figure 11:
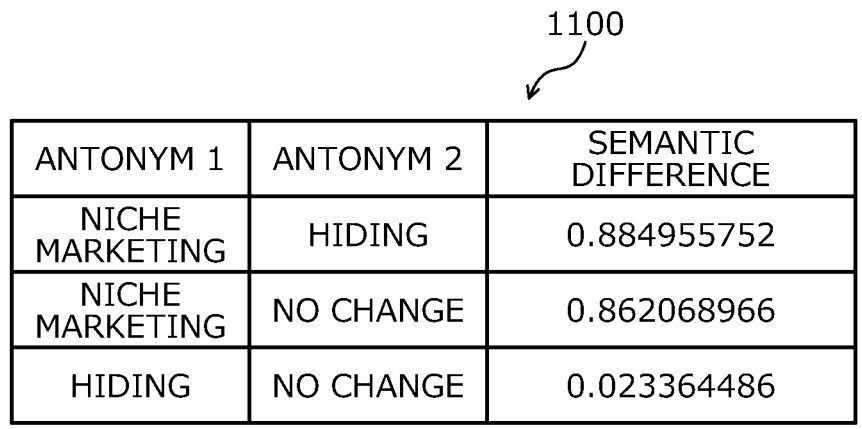
FIG. 11 is a diagram of a concrete example of a semantic difference list.

FIG. 11 is a diagram of the concrete example of the semantic difference list. In FIG. 11, a semantic difference list 1100 stores for each combination of an antonym 1 and an antonym 2, a semantic difference between the antonyms 1, 2. For example, the semantic difference between the antonym 1 "niche marketing" and the antonym 2 "hiding" is "0.884955752".

In FIG. 6, the creating unit 605, for example, refers to the semantic difference list (for example, the semantic difference list 1100 depicted in FIG. 11) and based on the combination of antonyms having a relatively large semantic difference, creates provision information for each of the groups Gi, Gj.

In particular, for example, the creating unit 605 refers to the semantic difference list 1100 and identifies the combination of antonyms having the largest semantic difference. In the example depicted in FIG. 11, the combination of the antonym 1 "niche marketing" and the antonym 2 "hiding" is identified. Subsequently, the creating unit 605 creates provision information that includes one of the identified antonyms and provision information that includes the other identified antonym. In the example depicted in FIG. 11, provision information that includes the antonym 1 "niche marketing" and provision information that includes the antonym 2 "hiding" are created.

In the description hereinafter, an antonym included in provision information may be indicated as "provision word".

Further, the creating unit 605 may include in the provision information, the screen information of the discussion contents information for which the statistical frequency of a word that corresponds to a provision word is the greatest among the discussion contents information retrieved in the past.

Here, concrete examples of the provision information created for the groups G1, G2 based on the semantic difference list 1100 depicted in FIG. 11 will be described with reference to FIGS. 12A and 12B.

Figure 12A:
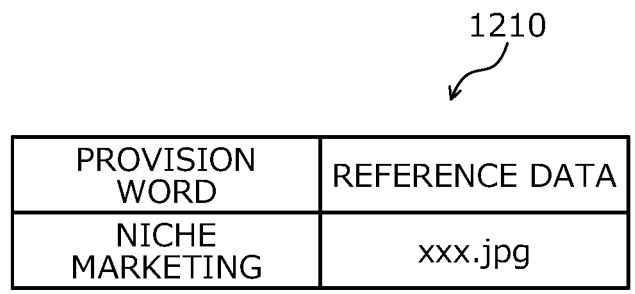
FIG. 12A is a diagram of a concrete example of provision information.

FIG. 12A is a diagram of a concrete example of the provision information. In FIG. 12A, provision information 1210 is information provided to the group G1 among the groups G1, G2 for which the contents of discussion are similar. The provision information 1210 includes a provision word "niche marketing" and reference data "xxx.jpg".

The provision word "niche marketing" is the antonym of a representative word "advertising" that characterizes the contents of the shared screen 510, i.e., the information shared within the group G. The reference data "xxx.jpg" is the screen information of a past screen shared during a discussion of the same topic, when the provision word "niche marketing" was used most.

Figure 12B:
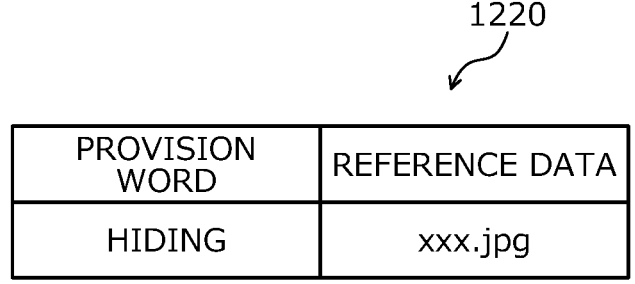
FIG. 12B is a diagram of a concrete example of the provision information.

FIG. 12B is a diagram of a concrete example of the provision information. In FIG. 12B, a provision information 1220 is information provided to the group G2 among the groups G1, G2 for which the contents of discussion are similar. The provision information 1220 includes a provision word "hiding" and the reference data "xxx.jpg".

The provision word "hiding" is the antonym of a representative word "display" that characterizes the contents of the shared screen 520, i.e., the information shared within the group G2. The reference data "xxx.jpg" is the screen information of a past screen shared during a discussion of the same topic, when the provision word "hiding" was used most.

The providing unit 606 provides the created provision information to at least one of the groups Gi, Gj. In particular, for example, the providing unit 606 transmits to the terminal apparatuses 201 of the group G1, the provision information 1210 depicted in FIG. 12A. Further, for example, the providing unit 606 transmits to the terminal apparatuses 201 of the group G2, the provision information 1220 depicted in FIG. 12B.

As a result, the provision information 1210, 1220 is displayed respectively on the displays 406 of the terminal apparatuses 201 of the groups G1, G2. An example of display of provision information by the display 406 of the terminal apparatus 201 will be described with reference to FIGS. 14A and 14B.

Further, configuration may be such that the providing unit 606 provides the created provision information within a predetermined period during a planned discussion period that is from the start of discussion at each of the groups Gi, Gj (start of group work) until the end thereof. The predetermined period may be arbitrarily set. For example, predetermined period is set as a period from the start of group work until an interval that is p% of the planned discussion period elapses. For example, a fixed value of about 30% to 70% may be set as p%.

In the description hereinafter, a period from the start of discussion by each of the groups Gi, Gj until an interval that is p% of the planned discussion period may be indicated as "discussion divergence completion period".

The providing unit 606, for example, may determine the discussion divergence completion period based on temporal changes in a write-count per unit time when highly evaluated group work was performed in the past. The write-count per unit time corresponds to the number of times information provided by a group is updated per unit time.

Further, the write-count per unit time when highly evaluated group work was performed in the past, for example, is stored in a discussion log table such as a discussion log table 1300 depicted in FIG. 13. Configuration may be such that the providing unit 606 uses the temporal change of the write-count per unit time when highly evaluated group work was performed and the discussion of contents that are similar to the contents of the discussions at the groups Gi, Gj was performed.

FIG. 13 is a diagram of an example of contents of the discussion log table 1300. In FIG. 13, the discussion log table 1300 stores temporal changes of the write-count per unit time for the highest evaluated group work performed in the past and an evaluation value of the group work.

In the example depicted in FIG. 13, the unit time is "5 minutes" and the planned discussion period is "45 minutes". Further, the evaluation value is an index that indicates how well discussion is performed as group work. The lowest evaluation value is "0" and the highest evaluation value is "100". An evaluation value of the group work is determined by, for example, participants of the group work, a facilitator, etc.

Here, an example of determining the discussion divergence completion period will be described taking the discussion log table 1300 as an example. First, the providing unit 606 refers to the discussion log table 1300 and identifies a period when the write-count per unit time decreases. The period when the write-count per unit time decreases may be regarded as a period when the discussion at the group begins to converge.

In the example depicted in FIG. 13, between a 30-minute mark and a 35-mark, the write-count per unit time decreases. In this case, the providing unit 606 identifies a ratio "30 minutes/45 minutes" of the period when the write-count per unit time decreases, to the planned discussion period. Next, the providing unit 606 sets the identified ratio "30 minutes/45 minutes" as "p" above and based on "p" and the planned discussion period, determines the discussion divergence completion period.

In particular, for example, the providing unit 606 may use equation (4) to calculate the discussion divergence completion period, where, p is the ratio of the period when the write-count per unit time decreases, to the planned discussion period; and t2 is the planned discussion period.

$$\text{discussion divergence completion period} = p \times t2 \qquad (4)$$

Here, when the current planned discussion period is "90 minutes", the discussion divergence completion period is "60 minutes". In this case, the providing unit 606 provides the provision information 1210, 1220 to the groups G1, G2 when the current discussion period (the time that has elapsed since the start of discussion) is less than the discussion divergence completion period "60 minutes".

As a result, before the discussion at each of the groups G1, G2 begins to converge, the provision information 1210, 1220 may be provided. Further, configuration may be such that the providing unit 606, for example, provides provision information to each of the groups Gi, Gj in response to receiving an instruction from a user such as a facilitator.

An example of display of provision information by the displays 406 of the terminal apparatuses 201 of the group Gi will be described with reference to FIGS. 14A and FIG. 14B.

FIG. 14A is a diagram of an example of display of provision information. In FIG. 14A, a shared screen 1410 is a display screen that is shared among the terminal apparatuses 201 of the group G1 and in which provision information 1411 is displayed as a pop-up on the shared screen 510 depicted in FIG. 5A.

The provision information 1411 is information that is displayed based on the provision information 1210 (refer to FIG. 12A) that is provided from the information processing apparatus 101. The provision information 1411 may encourage members of the group G1 to discuss "necessity of niche marketing", which differs from the contents of the discussion so far, and the provision information 1411 may help lively discussion take place at the group G1.

In the shared screen 1410, when a button 1412 is selected by user input, a past screen shared during a discussion of the same topic, when "niche marketing" was used most may be displayed on the display 406. As a result, the discussion may proceed while information from a past discussion is referred to.

Figure 14B:
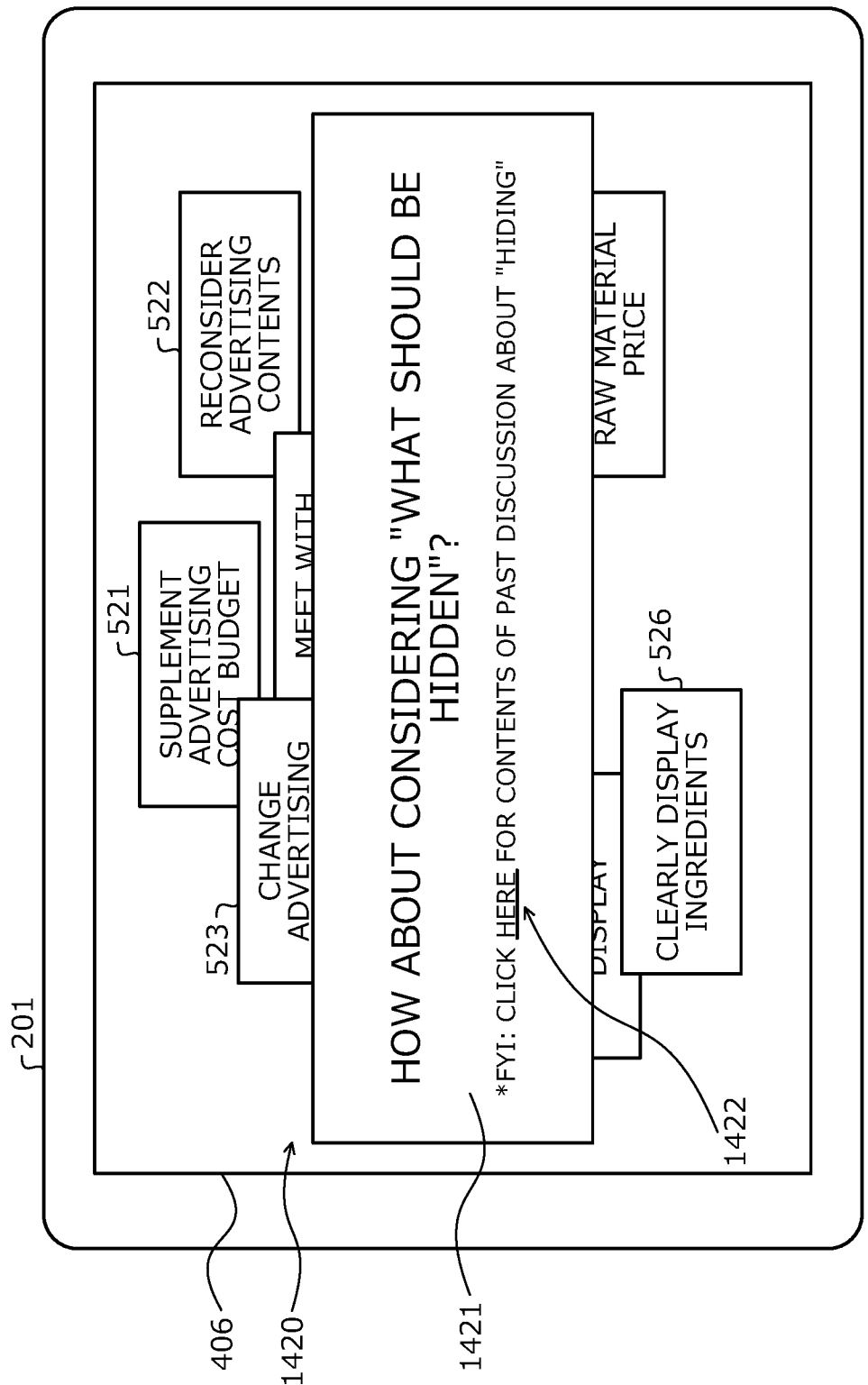
FIG. 14B is a diagram of an example of display of the provision information.

FIG. 14B is a diagram of an example of display of provision information. In FIG. 14B, a shared screen 1420 is a display screen that is shared among the terminal apparatuses 201 of the group G2 and in which provision information 1421 is displayed as a pop-up on the shared screen 520 depicted in FIG. 5B.

The provision information 1421 is information that is displayed based on the provision information 1220 (refer to FIG. 12B) provided from the information processing apparatus 101. The provision information 1421 may encourage members of the group G2 to discuss "necessity of hiding", which is different from the contents of the discussion so far, and the provision information 1421 may help lively discussion take place at the group G2. Further, since information whose contents differ from that provided to the group G1 is provided, the conclusions drawn may be urged to differ between the groups G1, G2.

In the shared screen 1420, when a button 1422 is selected by user input, a past screen shared during a discussion of the same topic, when "hiding" was used most may be displayed on the display 406. As a result, the discussion may proceed while information from a past discussion is referred to.

An information processing procedure of the information processing apparatus 101 will be described.

FIG. 15 is a flowchart of an example of the information processing procedure of the information processing apparatus 101. In the flowchart depicted in FIG. 15, first, the information processing apparatus 101 acquires for each of the groups Gi, the screen information of a shared screen (step S1501). Subsequently, the information processing apparatus 101 executes a discussion contents estimating process of estimating the contents of the discussion at each of the groups Gi (step S1502). A detailed process procedure of the discussion contents estimating process will be described with reference to FIGS. 16 and 17.

Next, the information processing apparatus 101 refers to the discussion contents list and calculates for each of the groups Gi, a K-dimensional statistical frequency vector that assumes as elements, the statistical frequencies of the representative words of the K types obtained by all of the groups G1 to Gn (step S1503). Subsequently, the information processing apparatus 101 uses equations (1) to (3) and calculates the degree-of-similarity $R_{ij}$ between all of the groups Gi, Gj (step S1504).

Next, the information processing apparatus 101 selects from the groups G1 to Gn not yet selected, a pair of the groups Gi, Gj (step S1505). Subsequently, the information processing apparatus 101 determines whether the degree-of-similarity $R_{ij}$ between the selected pair of the groups Gi, Gj is at least the threshold $R_{th}$ (step S1506).

Here, when the degree-of-similarity $R_{ij}$ is less than the threshold $R_{th}$ (step S1506: NO), the information processing apparatus 101 transitions to step S1509. On the other hand, when the degree-of-similarity $R_{ij}$ is the threshold $R_{th}$ or greater (step S1506: YES), the information processing apparatus 101 executes a provision information creating process of creating provision information for the groups Gi, Gj (step S1507). A detailed process procedure of the provision information creating process will be described with reference to FIG. 18.

Next, the information processing apparatus 101 executes an information providing process of providing the provision information to the groups Gi, Gj (step S1508). A detailed process procedure of the information providing process will be described with reference to FIG. 19. Subsequently, the information processing apparatus 101 judges whether among the groups G1 to Gn, a pair of the groups Gi, Gj not yet selected is present (step S1509).

Here, when a pair of the groups Gi, Gj not yet selected is present (step S1509: YES), the information processing apparatus 101 returns to step S1505. On the other hand, when a pair of the groups Gi, Gj not yet selected is not present (step S1509: NO), the information processing apparatus 101 ends the series of operations according to the present flowchart.

Thus, provision information that encourages a change in the direction of discussion may be provided to the groups Gi, Gj whose contents of discussion are similar therebetween.

A detailed process procedure of the discussion contents estimating process at step S1502 in FIG. 15 will be described.

Figure 16:
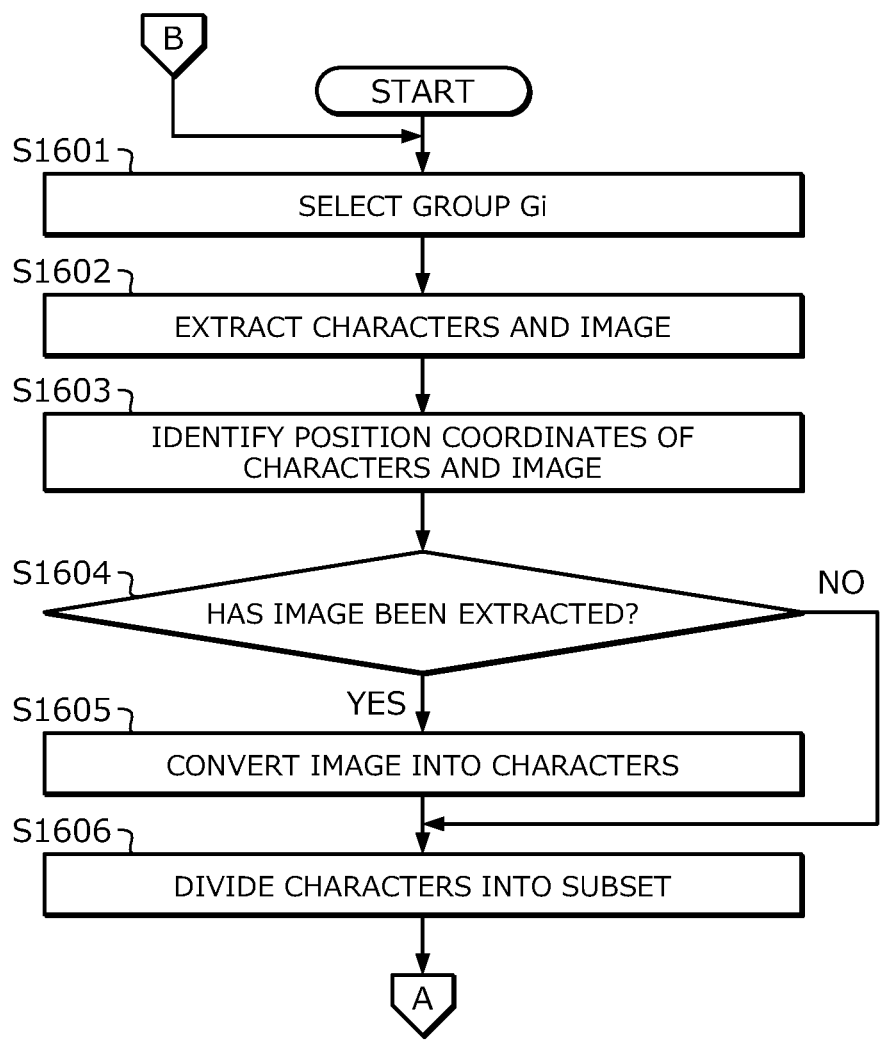
FIG. 16 is a flowchart of an example of a process procedure of a discussion contents estimating process.
Figure 17:
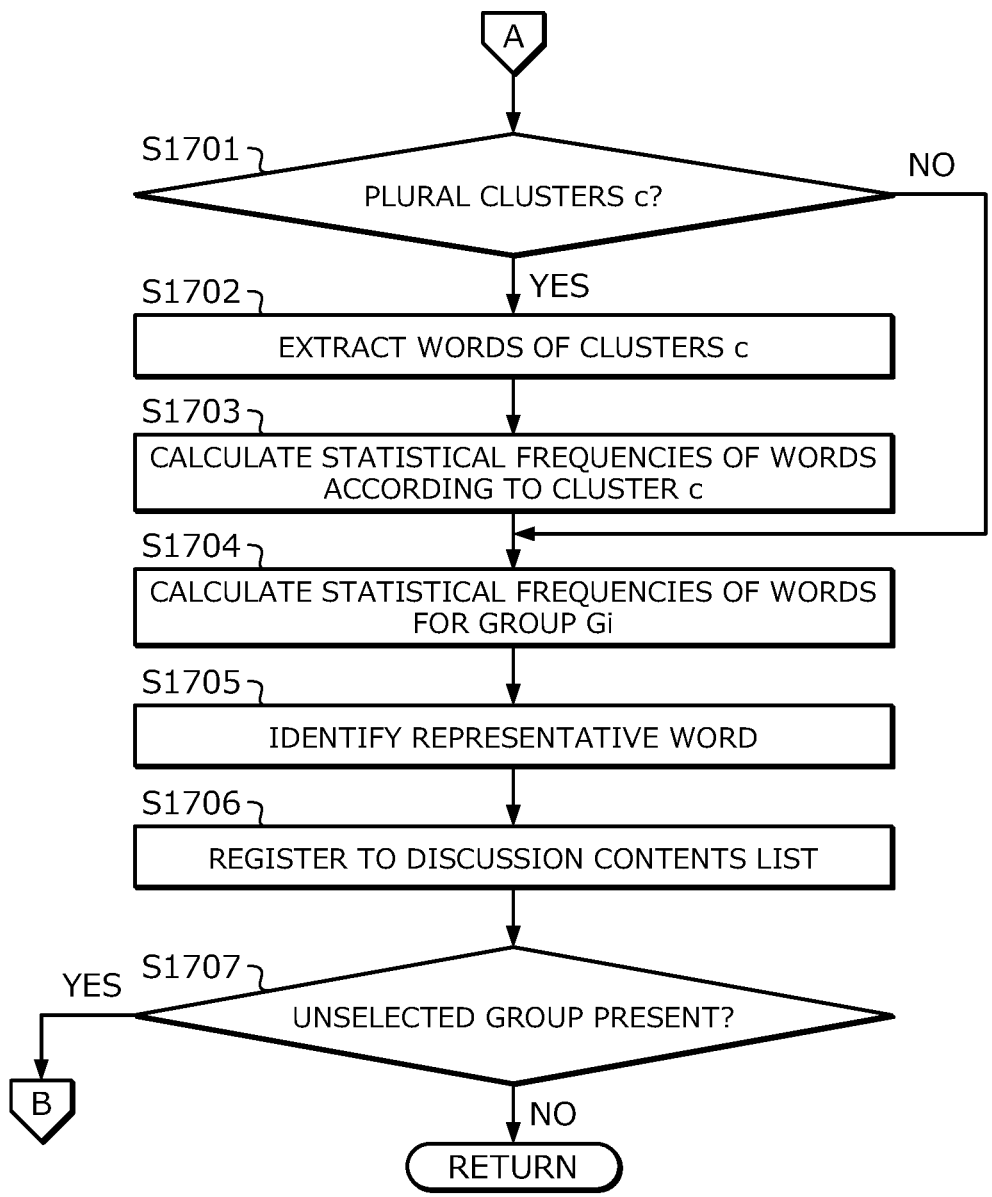
FIG. 17 is a flowchart of the example of the process procedure of the discussion contents estimating process.

FIGS. 16 and 17 are flowcharts of an example of the process procedure of the discussion contents estimating process. In the flowchart depicted in FIG. 16, first, the information processing apparatus 101 selects from the groups G1 to Gn, a group Gi that has not been selected (step S1601).

Next, the information processing apparatus 101 extracts from the screen information of a shared screen of the group Gi, characters and an image (step S1602). The information processing apparatus 101 identifies position coordinates of the extracted characters and image in the shared screen (step S1603). Next, the information processing apparatus 101 judges whether an image has been extracted from the screen information of the shared screen (step S1604).

Here, when no image has been extracted (step S1604: NO), the information processing apparatus 101 transitions to step S1606. On the other hand, when an image has been extracted (step S1604: YES), the information processing apparatus 101 performs image recognition processing on the extracted image and thereby converts the image into characters (step S1605).

Subsequently, based on the identified position coordinates of the characters (including the characters converted from the image), the information processing apparatus 101, performs cluster analysis of the characters and divides the characters into a subset (cluster c) (step S1606); and transitions to step S1701 depicted in FIG. 17.

In the flowchart depicted in FIG. 17, first, the information processing apparatus 101 judges whether there are plural clusters c (step S1701). Here, when there is one cluster c (step S1701: NO), the information processing apparatus 101 transitions to step S1704.

On the other hand, when there are plural clusters c (step S1701: YES), the information processing apparatus 101 performs morphological analysis of the characters of the clusters c and extracts words from the characters of the clusters c (step S1702). Subsequently, the information processing apparatus 101 calculates statistical frequencies of the words according to cluster c (step S1703).

Next, the information processing apparatus 101 calculates based on the words of all of the clusters c, the statistical frequencies of the words for the group Gi (step S1704). The information processing apparatus 101 identifies based on the statistical frequencies of the words according to cluster c and the statistical frequencies of the words for the group Gi, a representative word of the group Gi (step S1705).

Next, the information processing apparatus 101 registers the identified representative word of the group Gi to the discussion contents list (step S1706). In the discussion contents list, information that is a representative word that is not present in the group Gi and that is a representative word present in another group Gj is registered (for example, refer to FIG. 9). Subsequently, the information processing apparatus 101 judges whether a group is present that has not been selected from the groups G1 to Gn (step S1707).

Here, when a group that has not been selected is present (step S1707: YES), the information processing apparatus 101 returns to step S1601 depicted in FIG. 16. On the other hand, when a group that has not been selected is not present (step S1707: NO), the information processing apparatus 101 returns to the step that called the discussion contents estimating process.

As a result, representative words that characterize the pieces of information shared within the groups Gi, respectively, are identified, enabling the contents of the discussion at each of the groups Gi to be estimated.

Next, a detailed process procedure of the provision information creating process at step S1507 depicted in FIG. 15 will be described.

Figure 18:
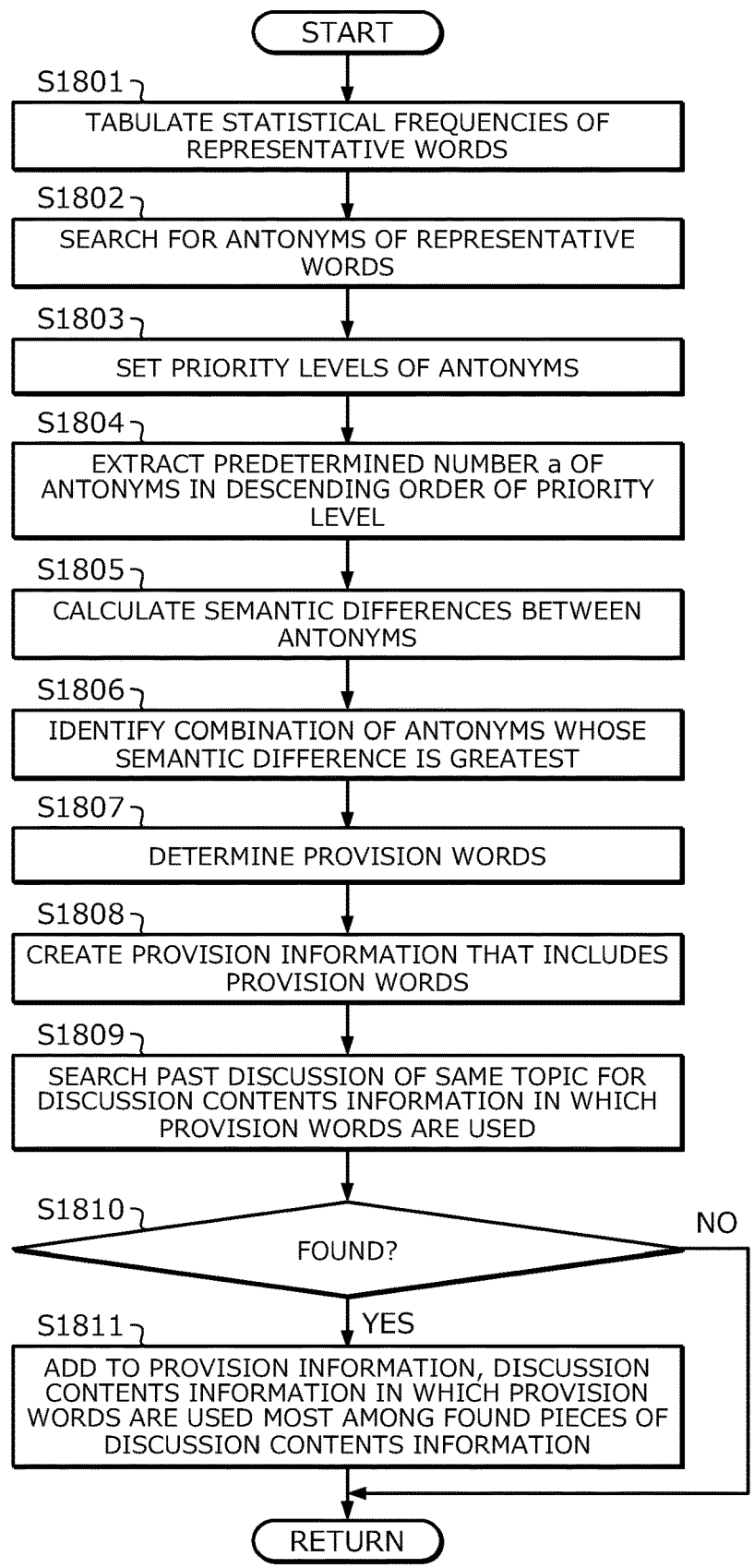
FIG. 18 is a flowchart of an example of a detailed process procedure of a provision information creating process.

FIG. 18 is a flowchart of an example of a detailed process procedure of the provision information creating process. In the flowchart depicted in FIG. 18, first, the information processing apparatus 101 refers to the discussion contents list and tabulates between the groups Gi, Gj, the statistical frequencies of the representative words (step S1801).

Next, the information processing apparatus 101 refers to the antonym dictionary information and searches for antonyms of the representative words whose statistical frequencies have been tabulated between the groups Gi, Gj (step S1802). The information processing apparatus 101, based on the tabulated statistical frequencies of the representative words, sets priority levels of the antonyms of the representative words (step S1803).

Next, the information processing apparatus 101 extracts from the retrieved antonyms, a predetermined number a of antonyms in descending order of the set priority level (step S1804). The predetermined number a may be arbitrarily set and, for example, is set to a value of about 3 to 5. The information processing apparatus 101 calculates semantic differences between the extracted antonyms (step S1805).

Next, the information processing apparatus 101 identifies the combination of antonyms whose calculated semantic difference is greatest (step S1806). The information processing apparatus 101 determines each of the antonyms included in the identified combination as a provision word (step S1807). The information processing apparatus 101 creates pieces of provision information that respectively include the determined provision words (step S1808).

Subsequently, the information processing apparatus 101 refers to the discussion contents DB 220 and searches a past discussion of the same topic for discussion contents information in which the provision words are used (step S1809). Next, the information processing apparatus 101 judges whether discussion contents information in which the provision words are used has been found in a past discussion of the same topic (step S1810).

Here, when discussion contents information in which the provision words are used has been found in a past discussion of the same topic (step S1810: YES), the information processing apparatus 101 adds to the pieces of provision information, the discussion contents information in which the provision words are used most among the found pieces of discussion contents information (step S1811), and returns to the step that called the provision information creating process. On the other hand, when no discussion contents information in which the provision words are used is found in a past discussion of the same topic (step S1810: NO), the information processing apparatus 101 returns to the step that called the provision information creating process.

As a result, provision information that encourages a change in the direction of the discussion at each of the groups Gi, Gj may be created. Configuration may be such that the information processing apparatus 101 uses an existing search engine to search for suggest-keywords of the provision words. Further, configuration may be such that the information processing apparatus 101 adds retrieved suggest-keywords to the provision information.

A detailed process procedure of the information providing process at step S1508 depicted in FIG. 15 will be described.

FIG. 19 is a flowchart of an example of a detailed process procedure of the information providing process. In the flowchart depicted in FIG. 19, first, the information processing apparatus 101 acquires the planned discussion period for group work (step S1901). The planned discussion period, for example, is specified in advance and stored in a storage apparatus such as the memory 302, the disk 305, etc.

Next, the information processing apparatus 101 determines the discussion divergence completion period (step S1902). The discussion divergence completion period, for example, may be determined as a preset fixed value, or may be determined based on temporal changes in a write-count per unit time when highly evaluated group work was performed in the past.

Next, the information processing apparatus 101 acquires the current discussion period, which indicates the time that has elapsed since the start of the discussion at each of the groups Gi, Gj (step S1903). The information processing apparatus 101 judges whether the acquired current discussion period is shorter than the determined discussion divergence completion period (step S1904).

Here, when the current discussion period is shorter than the discussion divergence completion period (step S1904: YES), the information processing apparatus 101 provides provision information to each of the groups Gi, Gj (step S1905), and returns to the step that called the information providing process. On the other hand, when the current discussion period is equal to or longer than discussion divergence completion period (step S1904: NO), the information processing apparatus 101 returns to the step that called the information providing process.

As a result, provision information that encourages a change in the direction of the discussion may be provided to each of the groups Gi, Gj. Further, provision of the provision information may be such that the provision information is not provided when a time is reached when the discussion at each of the groups Gi, Gj is to be converged.

As described, according to the information processing apparatus 101 of the present embodiment, the degree-of-similarity $R_{ij}$ may be calculated between the information shared within the group Gi and the information shared within the group Gj among the groups G1 to Gn. Further, according to the information processing apparatus 101, the provision information, which encourages a change in the direction of discussion, may be provided to each of the groups Gi, Gj, when the calculated degree-of-similarity $R_{ij}$ is at least the threshold $R_{th}$.

As a result, when the contents of the discussion at each of the groups Gi, Gj are similar and the same conclusion is likely to be drawn between the groups Gi, Gj, the provision information that encourages a change in the direction of the discussion may be provided to each of the groups Gi, Gj. As a result, discussion at the group level may be enlivened and discussions in the group work may be activated.

According to the information processing apparatus 101, a representative word that characterizes information shared within the group Gi may be identified by the information shared within the group Gi and based on the identified representative word, information that encourages a change in the direction of the discussion may be created. As a result, with consideration of the contents of the discussion at the group Gi, provision information for encouraging the discussion in a direction that should be discussed may be created.

Further, according to the information processing apparatus 101, the statistical frequency of each word included in the information shared within the group Gi may be calculated and based on the calculated statistical frequency of each word, a representative word that characterizes the information shared within the group Gi may be identified. As a result, a word whose occurrence frequency is high in a shared screen that is shared between members in the group Gi may be identified as a representative word.

According to the information processing apparatus 101, provision information that includes an antonym of a representative word may be created. As a result, information related to a word (antonym of a representative word) having a meaning that is opposite that of the contents of the discussion at the group Gi, i.e., information that causes the discussion at the group Gi to diverge, may be provided.

According to the information processing apparatus 101, within a predetermined period during the planned discussion period that is from the start to the end of the discussion at the group Gi, provision information that encourages a change in the direction of the discussion may be provided. As a result, control of the timing of provision may be such that the provision information is provided at a time when discussion should be diverged and the provision information is not provided at a time when the discussion should be converged.

Further, according to the information processing apparatus 101, when information that encourages a change in the direction of the discussion is provided to the groups Gi, Gj, the groups Gi, Gj may be provided with differing provision information. As a result, conclusions that differ between the groups Gi, Gj may be encouraged.

According to the information processing apparatus 101, for each combination of an antonym of a representative word of the group Gi and an antonym of a representative word of the group Gj, a semantic difference between the antonyms may be calculated. Further, according to the information processing apparatus 101, provision information that differs between the groups Gi, Gj may be created based on a combination of antonyms having a relatively large semantic difference. As a result, information that makes mutual associations between the groups Gi, Gj less likely may be provided and the discussions may be encouraged in directions so that the contents of the discussions do not again become similar between the groups Gi, Gj.

Thus, the information processing apparatus 101 enlivens discussion at the group level and encourages conclusions to be drawn that differ between groups, thereby enabling the activation of the discussions overall and the realization of efficient generation of ideas.

The information processing method described in the present embodiment may be realized by executing a prepared program on a computer such as a personal computer, a work station, etc. This information processing program is recorded on a non-transitory, computer-readable recording medium such as a hard disk, a flexible disk, a CD-ROM, a MO, a DVD, etc., and is read out from the recording medium and executed by the computer. Further, the information processing program may be distributed through a network such as the Internet.

According to one aspect of the embodiments of the present invention, an effect is achieved in the discussion at the group level may be enlivened and discussions at plural groups overall may be activated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory, the processor configured to:
obtain a first shared screen displayed for a first discussion group, the first shared screen indicates a first common topic being discussed by the first discussion group;
obtain a second shared screen displayed for a second discussion group, the second shared screen indicates a second common topic being discussed by the second discussion group, the first and the second discussion groups being among a plurality of discussion groups, and each of the plurality of discussion groups sharing information within the each of the plurality of discussion groups;
calculate a degree-of-similarity between the first shared screen of the first discussion group and the second shared screen of the second discussion group by comparing screen data of the first shared screen and the second shared screen;
identify, when the calculated degree-of-similarity is more than a threshold, a first representative word for the first discussion group and a second representative word for the second discussion group that characterize discussion content of the first and the second discussion groups, respectively; and
provide an antonym of the first representative word or the second representative word to one of the first and the second discussion groups, to display as a discussion topic change suggestion over the first shared screen or the second shared screen to encourage members of the first discussion group or the second discussion group to discuss contents that differ from the first common topic or the second common topic currently discussed by the first discussion group or the second discussion group.

2. The information processing apparatus according to claim 1, wherein
the discussion topic change suggestion to encourage members of the first discussion group or the second discussion group to discuss contents that differ from the first common topic or the second common topic currently discussed by the first discussion group or the second discussion group is to encourage a change in a direction of a discussion in the first discussion group or the second discussion group.

3. The information processing apparatus according to claim 1, wherein
the processor is further configured to:
calculate statistical frequencies of words included in the discussion content of the first and the second discussion groups, respectively, and
identify based on the calculated statistical frequencies of the words, the first and the second representative words that characterizes the discussion content of the first and the second discussion groups, respectively.

4. The information processing apparatus according to claim 1, wherein
the processor is to provide the antonym to the at least one of the first and the second discussion groups within a predetermined period during a planned discussion period that is from a start to an end of the discussion at the at least one of the first and the second discussion groups.

5. The information processing apparatus according to claim 1, wherein
the processor is to provide different antonyms to the first and the second discussion groups.

6. The information processing apparatus according to claim 5, wherein
the processor is further configured to:
calculate for each combination of a first antonym of the first representative word that characterizes the discussion content of the first discussion group and a second antonym of the second representative word that characterizes the discussion content of the second discussion group, a semantic difference between the first and the second antonyms, and
identify a combination of the first and the second antonyms for which the calculated semantic difference is relatively large.

7. The information processing apparatus according to claim 1, wherein
the discussion content of each of the plurality of discussion groups indicates contents of a discussion regarding topic common to the plurality of discussion groups.

8. An information processing method comprising:
obtaining a first shared screen displayed for a first discussion group, the first shared screen indicates a first common topic being discussed by the first discussion group;
obtaining a second shared screen displayed for a second discussion group, the second shared screen indicates a second common topic being discussed by the second discussion group, the first and the second discussion groups being among a plurality of discussion groups, and each of the plurality of discussion groups sharing information within the each of the plurality of discussion groups;
calculating, by a computer, a degree-of-similarity between the first shared screen of the first discussion group and the second shared screen of the second discussion group by comparing screen data of the first shared screen and the second shared screen;
identifying, by a computer and when the calculated degree-of-similarity is more than a threshold, a first representative word for the first discussion group and a second representative word for the second discussion group that characterize discussion content of the first and the second discussion groups, respectively; and
providing, by the computer, an antonym of the first representative word or the second representative word to at least one of the first and the second discussion groups, to display as a discussion topic change suggestion over the first shared screen or the second shared screen to encourage members of the first discussion group or the second discussion group to discuss contents that differ from the first common topic or the second common topic currently discussed by the first discussion group or the second discussion group.

9. A non-transitory, computer-readable recording medium storing therein an information processing program that causes a computer to execute a process comprising:
obtaining a first shared screen displayed for a first discussion group, the first shared screen indicates a first common topic being discussed by the first discussion group;
obtaining a second shared screen displayed for a second discussion group, the second shared screen indicates a second common topic being discussed by the second discussion group, the first and the second discussion groups being among a plurality of discussion groups, and each of the plurality of discussion groups sharing information within the each of the plurality of discussion groups;
calculating a degree-of-similarity between the first shared screen of the first discussion group and the second shared screen of the second discussion group by comparing screen data of the first shared screen and the second shared screen
identifying, when the calculated degree-of-similarity is more than a threshold, a first representative word for the first discussion group and a second representative word for the second discussion group that characterize discussion content the first and the second discussion groups, respectively; and
providing an antonym of the first representative word or the second representative word to one of the first and the second discussion groups, to display as a discussion topic change suggestion over the first shared screen or the second shared screen to encourage members of the first discussion group or the second discussion group to discuss contents that differ from the first common topic or the second common topic currently discussed by the first discussion group or the second discussion group.

* * * * *